(12) United States Patent
Rho et al.

(10) Patent No.: US 12,545,995 B2
(45) Date of Patent: Feb. 10, 2026

(54) METHOD FOR PREPARING LOW-LOSS HYDROGENATED AMORPHOUS SILICON THAT IS TRANSPARENT IN VISIBLE LIGHT, METHOD FOR PREPARING LOW-LOSS HYDROGENATED AMORPHOUS SILICON NITRIDE THAT IS TRANSPARENT IN VISIBLE LIGHT, AND METHOD FOR PREPARING LOW-LOSS HYDROGENATED AMORPHOUS SILICON OXIDE THAT IS TRANSPARENT IN VISIBLE LIGHT

(71) Applicant: POSTECH Academy-Industry Foundation, Pohang-si (KR)

(72) Inventors: Jun Suk Rho, Pohang-si (KR); Young Hwan Yang, Jeju-si (KR); Gwan Ho Yoon, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 69 days.

(21) Appl. No.: 18/282,037

(22) PCT Filed: Jan. 13, 2022

(86) PCT No.: PCT/KR2022/000640
§ 371 (c)(1),
(2) Date: Sep. 14, 2023

(87) PCT Pub. No.: WO2022/196915
PCT Pub. Date: Sep. 22, 2022

(65) Prior Publication Data
US 2024/0084444 A1 Mar. 14, 2024

(30) Foreign Application Priority Data

Mar. 17, 2021 (KR) .................. 10-2021-0034708
Jan. 13, 2022 (KR) .................. 10-2022-0004994

(51) Int. Cl.
*C23C 16/24* (2006.01)
*C23C 16/505* (2006.01)
*C23C 16/56* (2006.01)

(52) U.S. Cl.
CPC ............ *C23C 16/24* (2013.01); *C23C 16/505* (2013.01); *C23C 16/56* (2013.01)

(58) Field of Classification Search
None
See application file for complete search history.

(56) References Cited

U.S. PATENT DOCUMENTS 5,646,050 A * 7/1997 Li .................. H10F 71/103
136/258
8,349,412 B2 1/2013 Roca I Cabarrocas et al.
2005/0150542 A1 * 7/2005 Madan ................ H10F 19/40
257/E25.007
2012/0270362 A1 * 10/2012 Bakehe-Ananga ..................
H01L 21/02447
257/E31.024
2013/0019944 A1 * 1/2013 Hekmatshoar-Tabari ...........
H10F 77/1662
136/258

FOREIGN PATENT DOCUMENTS

JP          2009-76542        4/2009
KR    10-2009-0107017       10/2009
KR    10-2020-0071586        6/2020

OTHER PUBLICATIONS

Rao et al. "Amorphous silicon waveguides grown by PECVD on an Indium Tin Oxide buried contact" (2010).*
Yang et al. "Revealing structural disorder in hydrogenated amorphous silicon for a low-loss photonic platform at visible frequencies" (Jan. 2021).*
Younghwan Yang et al., "Revealing Structural Disorder in Hydrogenated Amorphous Silicon for a Low-Loss Photonic Platform at Visible Frequencies", Advanced Materials, vol. 33, No. 9, pp. 2005893-2005893, Jan. 2021.
Pohang University of Science & Technology, "Move over heavy goggles, here come the ultra-high refractive index lenses," (Feb. 16, 2021), phys.org. https://phys.org/news/2021-02-heavy-goggles-ultra-high-refractive-index.html (accessed Aug. 12, 2021).
KIPO, PCT Search Report of PCT/KR2022/000640 dated Apr. 28, 2022.

* cited by examiner

*Primary Examiner* — Austin Murata
(74) *Attorney, Agent, or Firm* — LEX IP MEISTER, PLLC

(57) ABSTRACT

According to an embodiment of the present invention, there is provided method for preparing low-loss hydrogenated amorphous silicon nitride that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer 200 onto the substrate, and gases inserted into the chamber further comprise $N_2$ gas apart from the $H_2$ gas and the $SiH_4$ gas.

Further, there is provided a method for preparing low-loss hydrogenated amorphous silicon oxide that is transparent in visible light further comprising $O_2$ gas apart from the $H_2$ gas and the $SiH_4$ gas.

Further, there is provided a method for preparing low-loss hydrogenated amorphous silicon that is transparent in visible light further comprising Ar gas apart from the $H_2$ gas and the $SiH_4$ gas.

11 Claims, 18 Drawing Sheets

[FIG. 1]
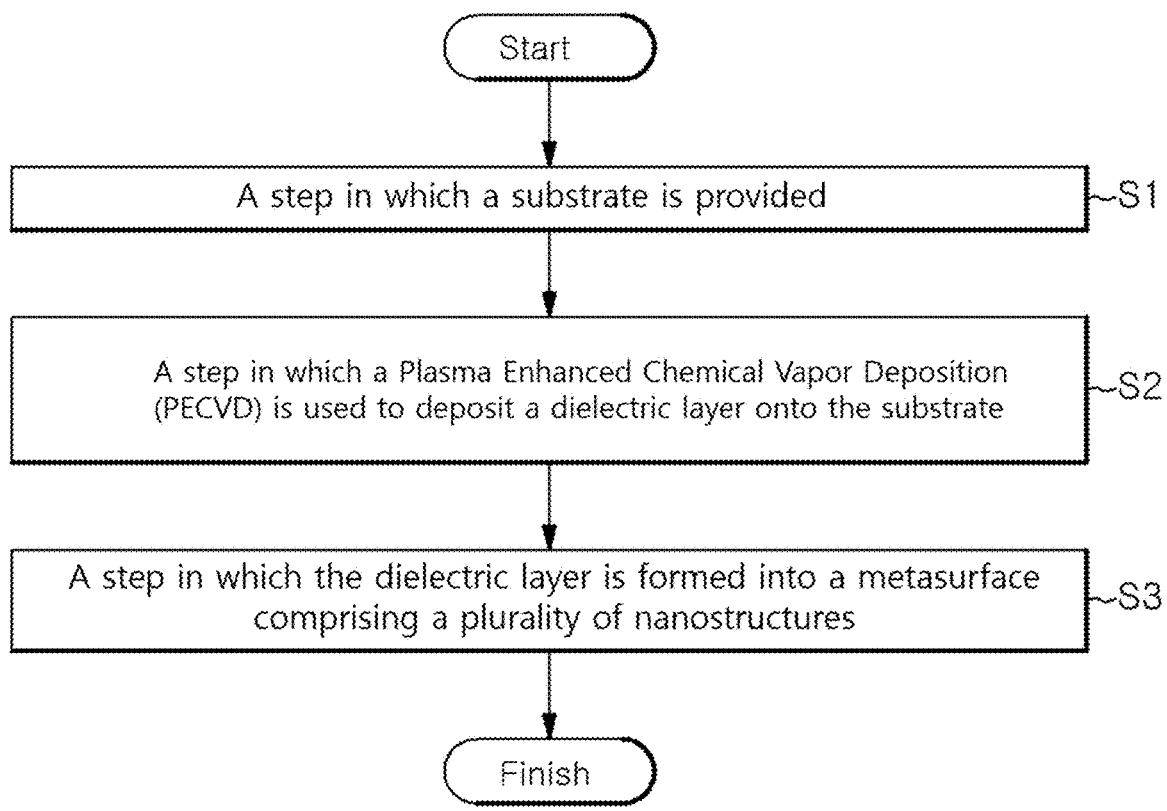

[FIG. 2]
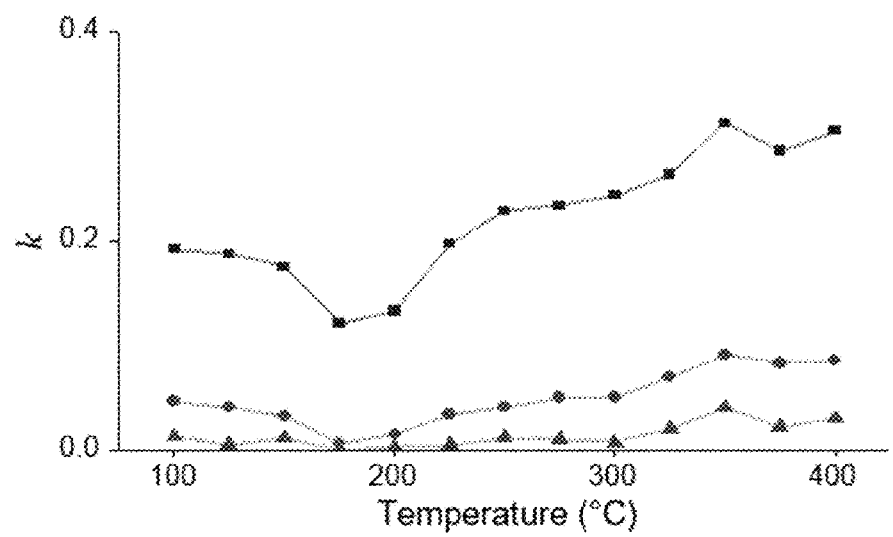
[FIG. 3]
| TEMPERATURE (Degree) | 100 | 125 | 150 | 175 | 200 | 225 | 250 | 275 | 300 | 325 | 350 | 375 | 400 |
|---|---|---|---|---|---|---|---|---|---|---|---|---|---|
| RED (635 nm) | 0.0132 | 0.0053 | 0.0113 | 0.0001 | 0.0027 | 0.0052 | 0.0119 | 0.0103 | 0.0074 | 0.0207 | 0.0403 | 0.0227 | 0.0305 |
| GREEN (532 nm) | 0.0466 | 0.0411 | 0.0322 | 0.0070 | 0.0145 | 0.0339 | 0.0403 | 0.05 | 0.05 | 0.0702 | 0.0897 | 0.0828 | 0.0846 |
| BLUE (450 nm) | 0.1918 | 0.1868 | 0.1750 | 0.1211 | 0.1331 | 0.1970 | 0.2284 | 0.2336 | 0.2431 | 0.2631 | 0.312 | 0.2848 | 0.3046 |

[FIG. 4]
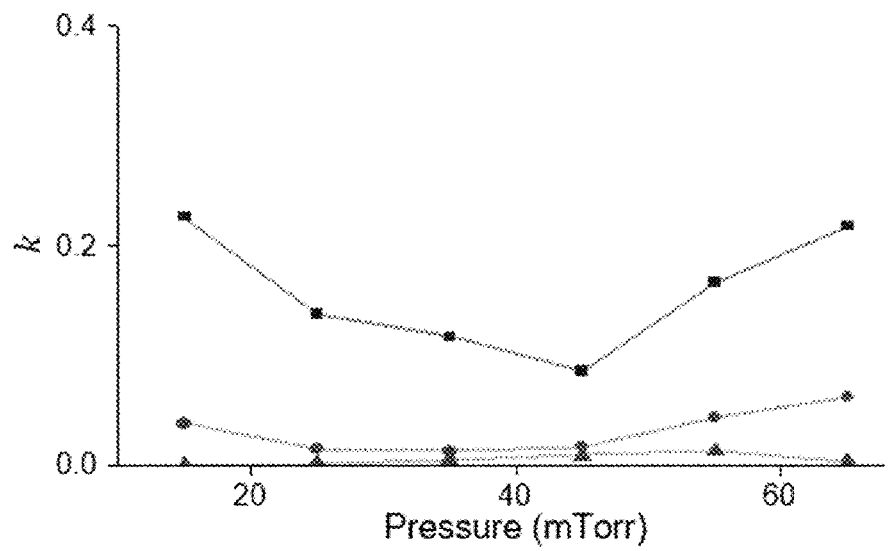
[FIG. 5]
| PRESSURE (mTorr) | 15 | 25 | 35 | 45 | 55 | 65 |
|---|---|---|---|---|---|---|
| RED (635 nm) | 0.0008 | 0.0019 | 0.0055 | 0.0094 | 0.0132 | 0.0035 |
| GREEN (532 nm) | 0.0380 | 0.0150 | 0.0128 | 0.0173 | 0.0442 | 0.0620 |
| BLUE (450 nm) | 0.2260 | 0.1382 | 0.1171 | 0.0856 | 0.1662 | 0.2175 |

[FIG. 6]
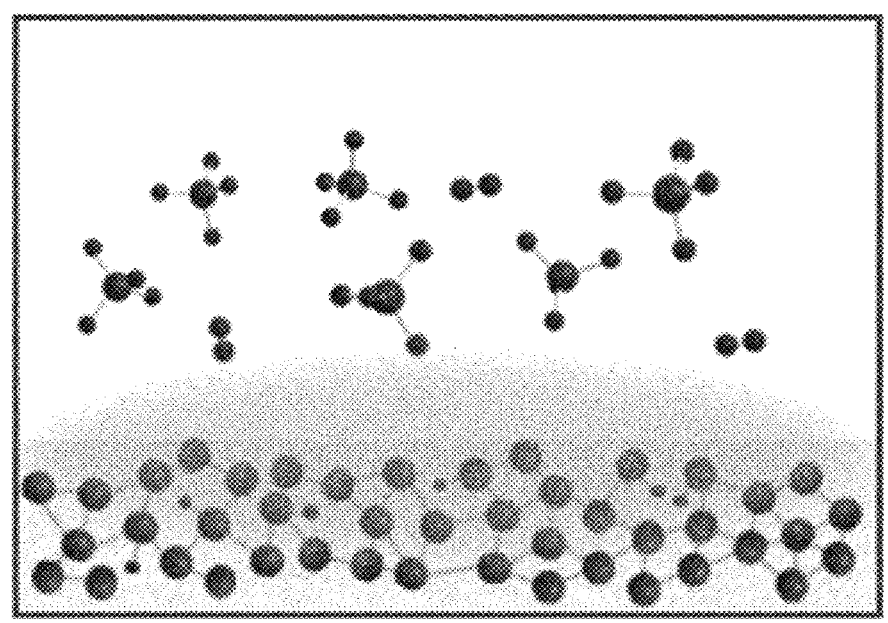
[FIG. 7]
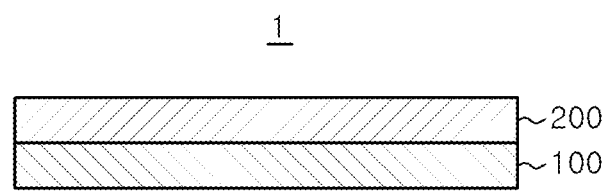

[FIG. 8]
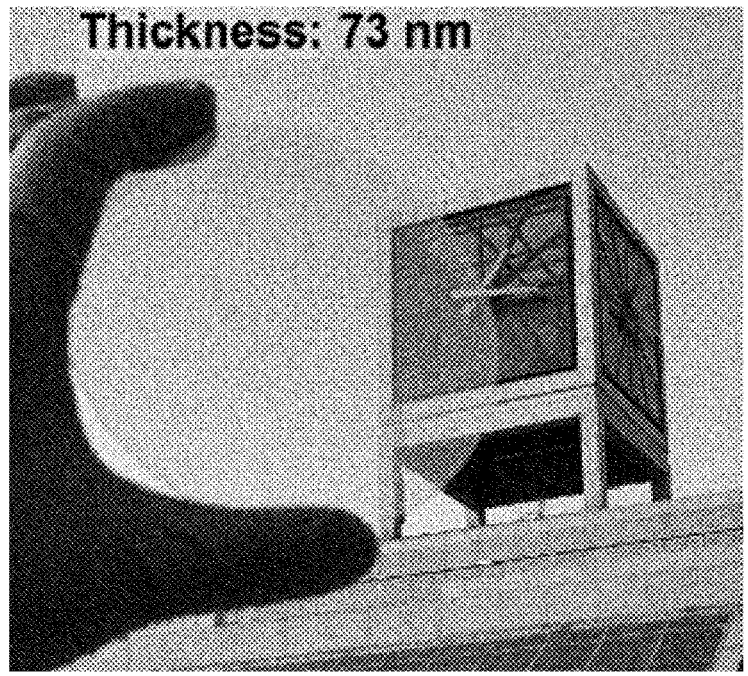
[FIG. 9]
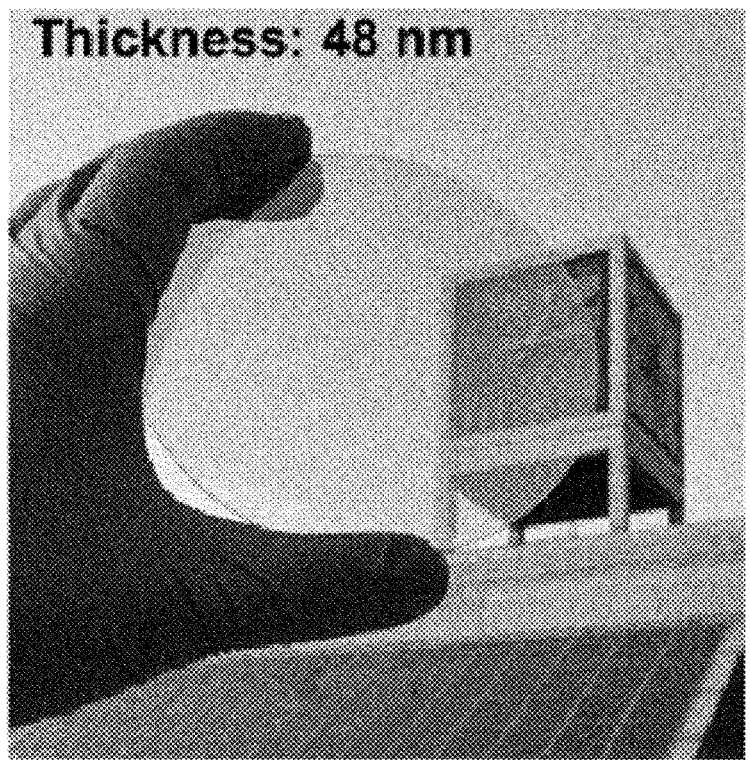

[FIG. 10]
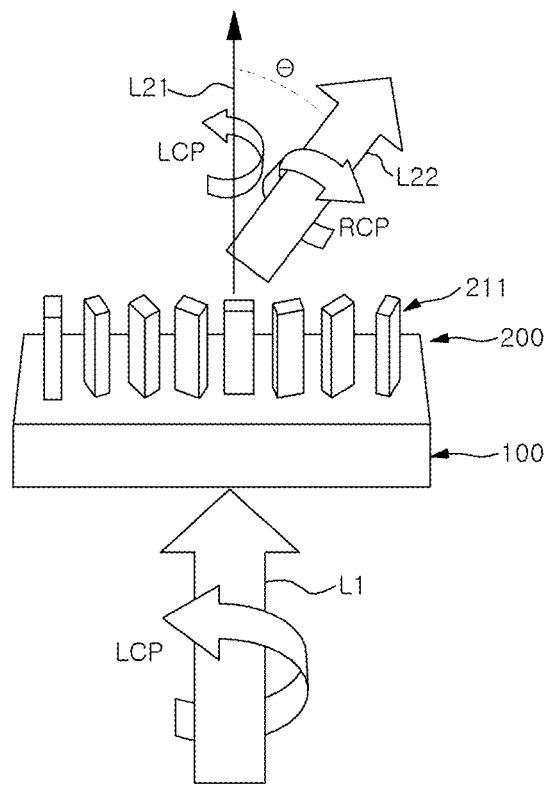
[FIG. 11]
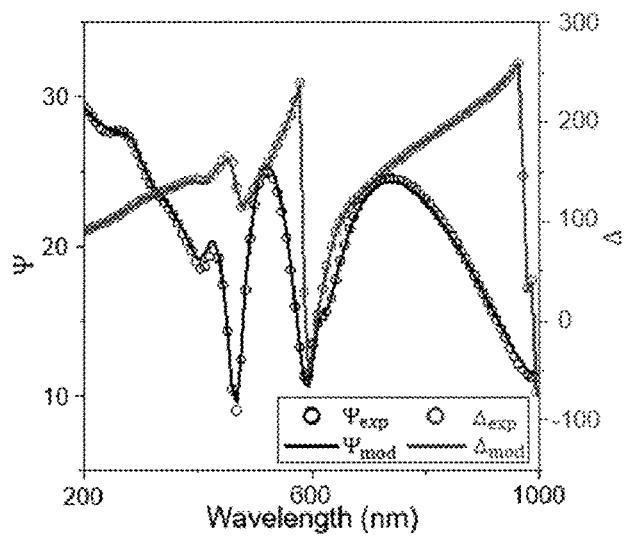

[FIG. 12]
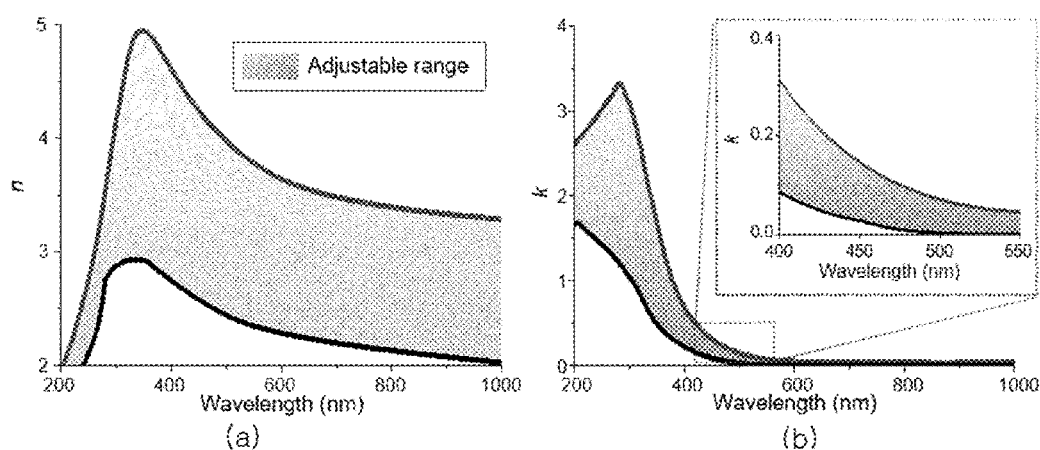
[FIG. 13]
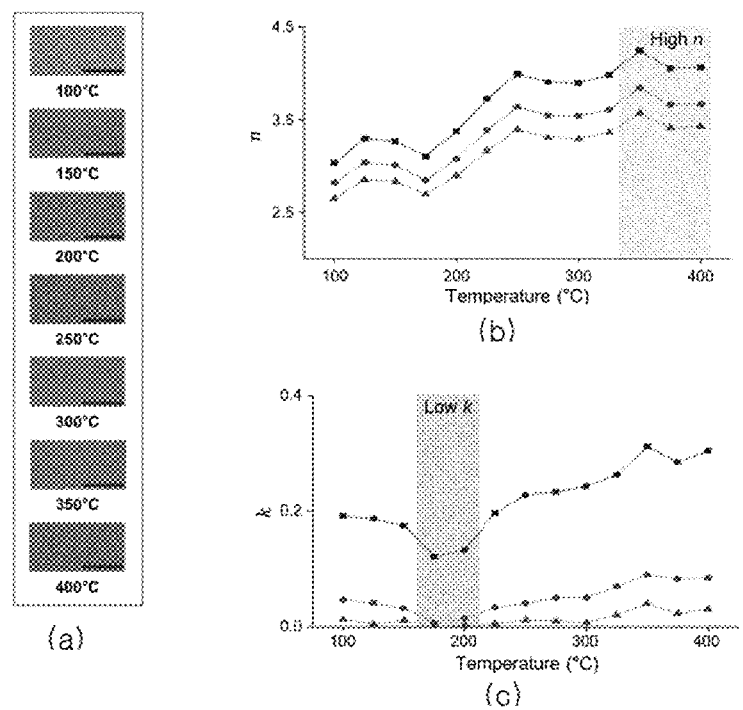

[FIG. 14]
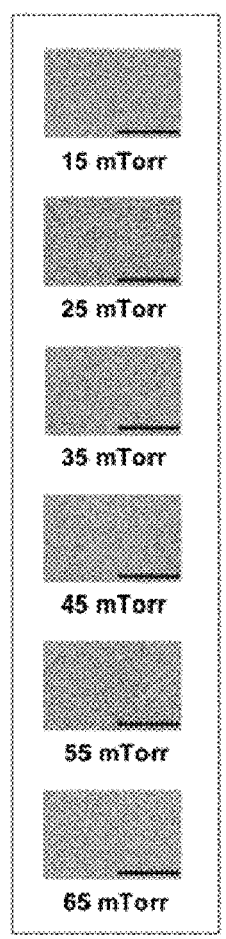
(a)
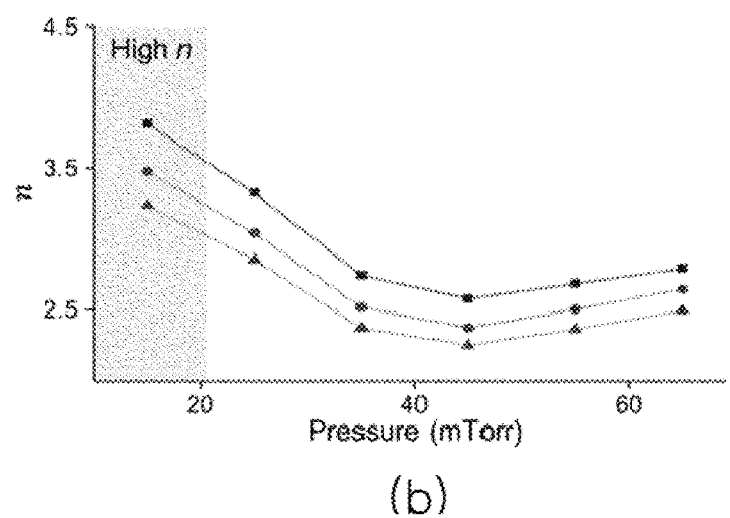
(b)
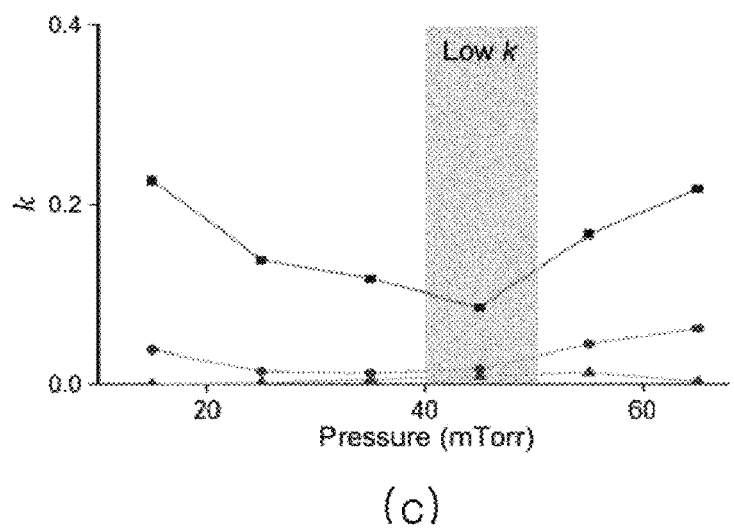
(c)

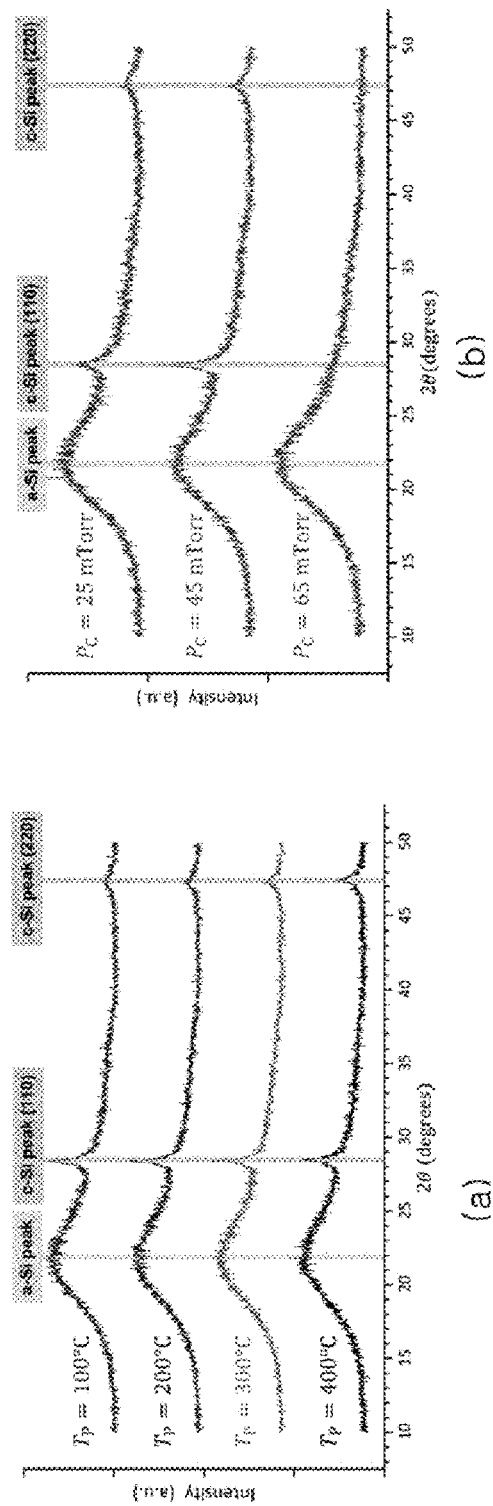
[FIG. 15]

[FIG. 16]
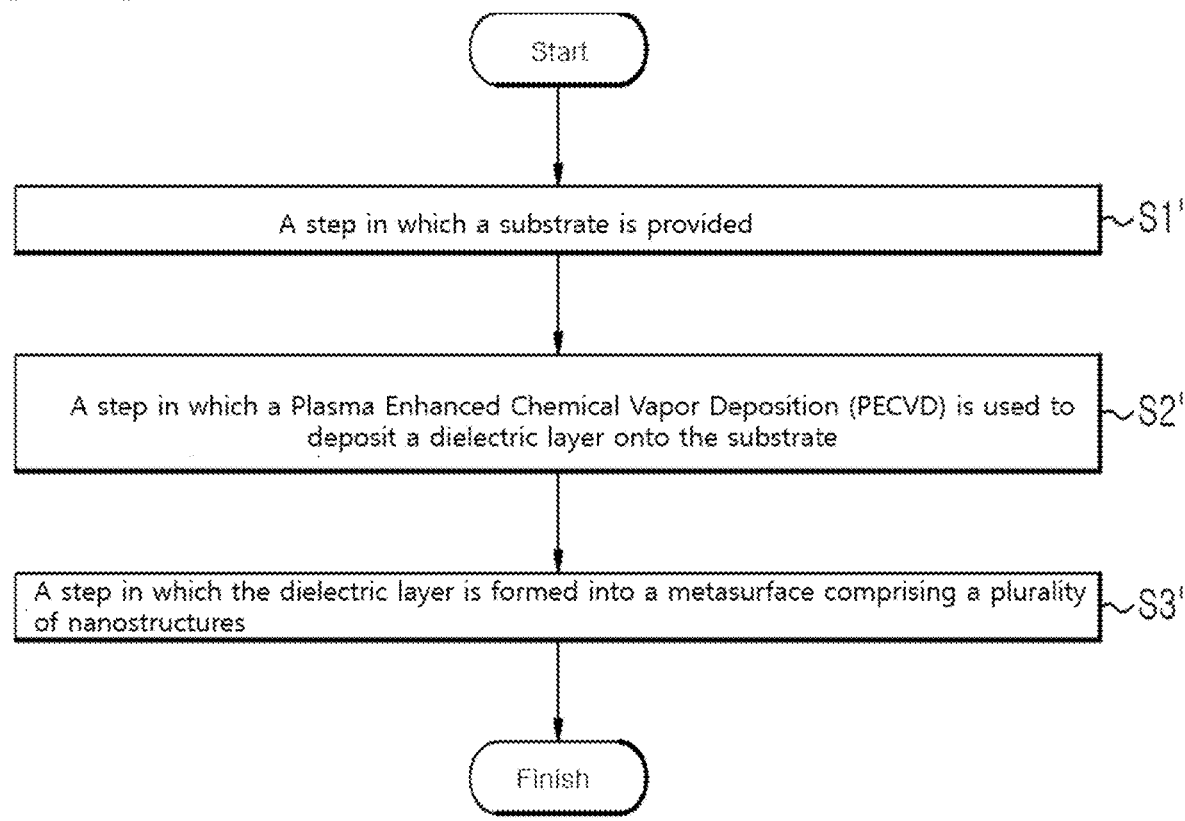

[FIG. 17]

| $N_2$ Insertion | | $N_2$ Inserted amount | | |
|---|---|---|---|---|
| | | Embodiment 1 | Embodiment 2 | Embodiment 3 |
| | | $N_2$ 1sccm | $N_2$ 3sccm | $N_2$ 5sccm |
| Refractive index (n) | 450 nm | 3.424443 | 3.329697 | 2.822514 |
| | 473 nm | 3.325079 | 3.426828 | 2.779855 |
| | 532 nm | 3.132930 | 3.170717 | 2.656462 |
| | 635 nm | 2.947198 | 2.967163 | 2.542415 |

[FIG. 18]

| $N_2$ Insertion | | $N_2$ Inserted amount | | |
|---|---|---|---|---|
| | | Embodiment 1 | Embodiment 2 | Embodiment 3 |
| | | $N_2$ 1sccm | $N_2$ 3sccm | $N_2$ 5sccm |
| Extinct coefficient(k) | 450 nm | 0.149177 | 0.251804 | 0.129033 |
| | 473 nm | 0.091505 | 0.18911 | 0.74816 |
| | 532 nm | 0.015736 | 0.050089 | 0.004977 |
| | 635 nm | 0.0 | 0 | 0.000094 |

[FIG. 19]

| O₂ Insertion | | O₂ Inserted amount | | |
|---|---|---|---|---|
| | | Embodiment 4 | Embodiment 5 | Embodiment 6 |
| | | O₂ 1sccm | O₂ 2sccm | O₂ 3sccm |
| Refractive index (n) | 450 nm | 3.313264 | 2.9594 | 2.750408 |
| | 473 nm | 3.230552 | 2.902945 | 2.689918 |
| | 532 nm | 3.075483 | 2.772772 | 2.566676 |
| | 635 nm | 2.919844 | 2.638939 | 2.45442 |

[FIG. 20]

| O₂ Insertion | | O₂ Inserted amount | | |
|---|---|---|---|---|
| | | Embodiment 4 | Embodiment 5 | Embodiment 6 |
| | | O₂ 1sccm | O₂ 2sccm | O₂ 3sccm |
| Extinct coefficient(k) | 450 nm | 0.116119 | 0.097849 | 0.086736 |
| | 473 nm | 0.075641 | 0.05885 | 0.044908 |
| | 532 nm | 0.017806 | 0.005838 | 0.001222 |
| | 635 nm | 0.000108 | 0.0 | 0.00067 |

[FIG. 21]
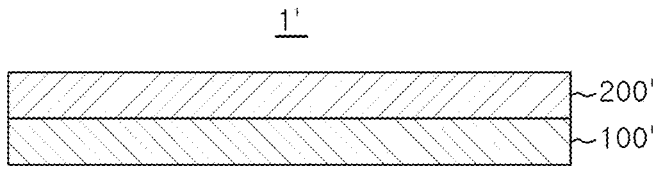
[FIG. 22]
| Ratio adjustment | | R = H2 / SiH4 | | | | |
|---|---|---|---|---|---|---|
| | | Comparative example 1 | Comparative example 2 | Comparative example 3 | Embodiment 7 | Embodiment 8 |
| | | 3.25 | 4.67 | 7.5 | 9.625 | 13.167 |
| Refractive index (n) | 450 nm | 3.028314 | 2.937857 | 2.93493 | 2.888659 | 3.018599 |
| | 473 nm | 2.964414 | 2.866546 | 2.867698 | 2.842885 | 2.973189 |
| | 532 nm | 2.767663 | 2.699483 | 2.778786 | 2.767779 | 2.889898 |
| | 635 nm | 2.593734 | 2.57423 | 2.693858 | 2.695427 | 2.794933 |
[FIG. 23]
| Ratio adjustment | | R = H2 / SiH4 | | | | |
|---|---|---|---|---|---|---|
| | | Comparative example 1 | Comparative example 2 | Comparative example 3 | Embodiment 7 | Embodiment 8 |
| | | 3.25 | 4.67 | 7.5 | 9.625 | 13.167 |
| Extinct coefficient(k) | 450 nm | 0.25582 | 0.119407 | 0.030573 | 0.019089 | 0.02124 |
| | 473 nm | 0.144371 | 0.053829 | 0.00575 | 0.005666 | 0.005324 |
| | 532 nm | 0.003617 | 0 | 0 | 0 | 0 |
| | 635 nm | 0.0 | 0 | 0 | 0 | 0 |

[FIG. 24]
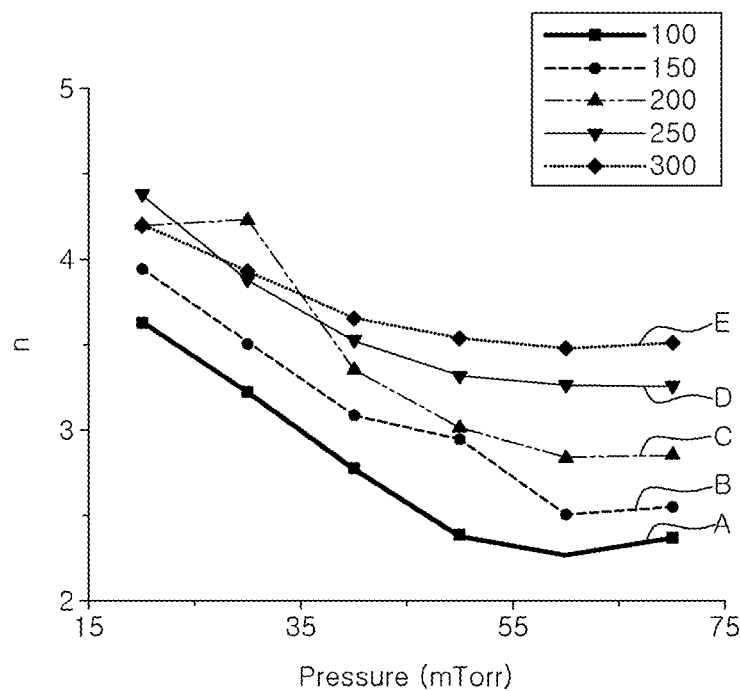
[FIG. 25]
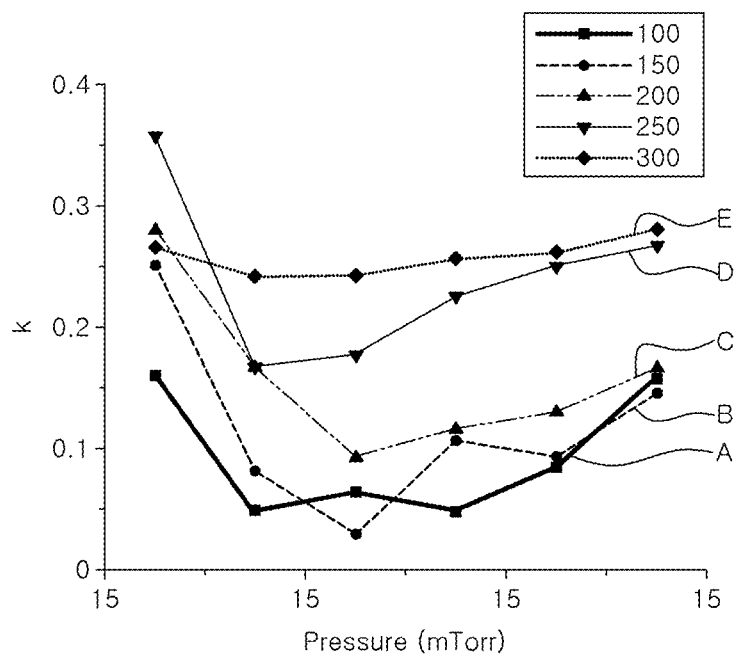

[FIG. 26]

| Refractive index(n) | | Pressure (mTorr) | | | | | |
|---|---|---|---|---|---|---|---|
| | | 20 | 30 | 40 | 50 | 60 | 70 |
| Temperature (°C) | 100 | 3.482155 | 3.038763 | 2.681456 | 2.354049 | 2.313554 | 2.351943 |
| | 150 | 3.829098 | 3.453156 | 3.025421 | 2.676646 | 2.558591 | 2.57381 |
| | 200 | 4.073652 | 3.757543 | 3.280291 | 2.940571 | 2.812697 | 2.814831 |
| | 250 | 4.0798 | 3.771972 | 3.399932 | 3.188652 | 3.126496 | 3.124716 |
| | 300 | 4.051667 | 3.765198 | 3.49482 | 3.371631 | 3.326445 | 3.352933 |
| | 350 | 4.044029 | 3.802243 | 3.580668 | 3.456172 | 3.442409 | 3.474417 |

[FIG. 27]

| Extinct coefficient(k) | | Pressure (mTorr) | | | | | |
|---|---|---|---|---|---|---|---|
| | | 20 | 30 | 40 | 50 | 60 | 70 |
| Temperature (°C) | 100 | 0.094524 | 0.022656 | 0.02562 | 0.041127 | 0.053842 | 0.091536 |
| | 150 | 0.147526 | 0.064918 | 0.013462 | 0.032351 | 0.057792 | 0.103386 |
| | 200 | 0.176218 | 0.074412 | 0.04167 | 0.05073 | 0.076015 | 0.117298 |
| | 250 | 0.123002 | 0.091705 | 0.096438 | 0.129533 | 0.143041 | 0.157606 |
| | 300 | 0.160326 | 0.091705 | 0.137965 | 0.146464 | 0.154979 | 0.169085 |
| | 350 | 0.183296 | 0.166569 | 0.152238 | 0.148093 | 0.153326 | 0.16231 |

[FIG. 28]

| Refractive index(n) | | Pressure (mTorr) | | | | | |
|---|---|---|---|---|---|---|---|
| | | 20 | 30 | 40 | 50 | 60 | 70 |
| Temperature (°C) | 100 | 3.566089 | 3.097412 | 2.723635 | 2.387173 | 2.355254 | 2.387943 |
| | 150 | 3.927434 | 3.514433 | 3.088594 | 2.728094 | 2.605728 | 2.615374 |
| | 200 | 4.189227 | 3.856033 | 3.376931 | 3.025076 | 2.882125 | 2.867768 |
| | 250 | 4.213671 | 3.891453 | 3.498629 | 3.27195 | 3.205283 | 3.201591 |
| | 300 | 4.187616 | 3.885021 | 3.597529 | 3.465457 | 3.415522 | 3.441718 |
| | 350 | 4.184043 | 3.924716 | 3.689641 | 3.55554 | 3.539792 | 3.573401 |

[FIG. 29]

| Extinct coefficient(k) | | Pressure (mTorr) | | | | | |
|---|---|---|---|---|---|---|---|
| | | 20 | 30 | 40 | 50 | 60 | 70 |
| Temperature (°C) | 100 | 0.177221 | 0.058374 | 0.049612 | 0.066074 | 0.099789 | 0.146369 |
| | 150 | 0.261616 | 0.109343 | 0.042886 | 0.066251 | 0.102515 | 0.162626 |
| | 200 | 0.287553 | 0.133818 | 0.095303 | 0.107675 | 0.13749 | 0.175747 |
| | 250 | 0.219337 | 0.175492 | 0.175492 | 0.216753 | 0.233286 | 0.251135 |
| | 300 | 0.260882 | 0.234615 | 0.231329 | 0.239871 | 0.248409 | 0.265193 |
| | 350 | 0.289637 | 0.26832 | 0.250186 | 0.242269 | 0.248425 | 0.260065 |

[FIG. 30]

| Refractive index(n) | | Pressure (mTorr) | | | | | |
|---|---|---|---|---|---|---|---|
| | | 20 | 30 | 40 | 50 | 60 | 70 |
| Temperature (°C) | 100 | 3.27491 | 2.918203 | 2.590173 | 2.205521 | 2.355254 | 2.247324 |
| | 150 | 3.572908 | 3.315964 | 2.907653 | 2.443733 | 2.605728 | 2.457402 |
| | 200 | 3.81442 | 3.555305 | 3.090196 | 2.655147 | 2.882125 | 2.689561 |
| | 250 | 3.805929 | 3.524229 | 3.18625 | 2.937577 | 3.205283 | 2.938537 |
| | 300 | 3.781812 | 3.517211 | 3.27152 | 3.124758 | 3.415522 | 3.151702 |
| | 350 | 3.770033 | 3.552578 | 3.34893 | 3.239396 | 3.228335 | 3.257641 |

[FIG. 31]

| Extinct coefficient(k) | | Pressure (mTorr) | | | | | |
|---|---|---|---|---|---|---|---|
| | | 20 | 30 | 40 | 50 | 60 | 70 |
| Temperature (°C) | 100 | 0.000886 | 0 | 0.000274 | 0.006408 | 0.000414 | 0.026005 |
| | 150 | 0.005006 | 0.00671 | 0 | 0 | 0.002198 | 0.013854 |
| | 200 | 0.027362 | 0.005197 | 0 | 0 | 0.003452 | 0.028991 |
| | 250 | 0.010301 | 0.002432 | 0.004946 | 0.014686 | 0.019805 | 0.026344 |
| | 300 | 0.031168 | 0.018792 | 0.018251 | 0.06913 | 0.027118 | 0.034547 |
| | 350 | 0.04379 | 0.033506 | 0.024834 | 0.023601 | 0.026005 | 0.030161 |

[FIG. 32]

| Refractive index(n) | | Pressure (mTorr) | | | | | |
|---|---|---|---|---|---|---|---|
| | | 20 | 30 | 40 | 50 | 60 | 70 |
| Temperature (°C) | 100 | 3.092675 | 2.813402 | 2.497661 | 2.188964 | 2.11451 | 2.133019 |
| | 150 | 3.340785 | 3.167405 | 2.804147 | 2.461373 | 2.335705 | 2.325406 |
| | 200 | 3.541118 | 3.356164 | 2.929839 | 2.623008 | 2.511945 | 2.534132 |
| | 250 | 3.553143 | 3.310198 | 2.992833 | 2.804801 | 2.742671 | 2.738217 |
| | 300 | 3.508149 | 3.27557 | 3.05107 | 2.947987 | 2.912149 | 2.931154 |
| | 350 | 3.485492 | 3.296031 | 3.115805 | 3.019737 | 3.007899 | 3.030571 |

[FIG. 33]

| Extinct coefficient(k) | | Pressure (mTorr) | | | | | |
|---|---|---|---|---|---|---|---|
| | | 20 | 30 | 40 | 50 | 60 | 70 |
| Temperature (°C) | 100 | 0 | 0 | 0 | 0 | 0 | 0 |
| | 150 | 0 | 0 | 0 | 0 | 0 | 0 |
| | 200 | 0 | 0 | 0 | 0 | 0 | 0 |
| | 250 | 0 | 0 | 0 | 0 | 0 | 0 |
| | 300 | 0 | 0 | 0 | 0 | 0 | 0 |
| | 350 | 0 | 0 | 0 | 0 | 0 | 0 |

METHOD FOR PREPARING LOW-LOSS HYDROGENATED AMORPHOUS SILICON THAT IS TRANSPARENT IN VISIBLE LIGHT, METHOD FOR PREPARING LOW-LOSS HYDROGENATED AMORPHOUS SILICON NITRIDE THAT IS TRANSPARENT IN VISIBLE LIGHT, AND METHOD FOR PREPARING LOW-LOSS HYDROGENATED AMORPHOUS SILICON OXIDE THAT IS TRANSPARENT IN VISIBLE LIGHT

TECHNICAL FIELD

This disclosure relates to a method for preparing low-loss hydrogenated amorphous silicon that is transparent in visible light, method for preparing low-loss hydrogenated amorphous silicon nitride that is transparent in visible light, and method for preparing low-loss hydrogenated amorphous silicon oxide that is transparent in visible light.

BACKGROUND

In order to produce a metasurface operational in a visible light range, a transparent silicon with high refractive index and low light absorption is required.

However, a conventionally used silicon is disadvantageous in that it is opaque in visible light range as it shows high optical attenuation in the visible light range, especially in a range below wavelength of 600 nm.

In order to overcome such disadvantage, materials with low optical attenuation such as $SiO_2$, $Si_3N_4$, $TiO_2$, and GaN have been used in attempts to produce a silicon.

However, in case of the $SiO_2$, refractive index is 1.45, and in case of the $Si_3N_4$, refractive index is 1.9, so application onto a metasurface is restricted.

In case of $TiO_2$, and GaN, the refractive index may reach 2.3 but they are disadvantageous in that $TiO_2$ requires atomic later deposition process method, and GaN requires twice the etching process through hard mask so the production cost of the metasurface is increased.

SUMMARY

The embodiments of the present invention are suggested to tackle such problems and aim to provide a method for preparing low-loss hydrogenated amorphous silicon that is transparent in visible light, a method for preparing low-loss hydrogenated amorphous silicon nitride that is transparent in visible light, and a method for preparing low-loss hydrogenated amorphous silicon oxide that is transparent in visible light configured to reduce cost of early production facilities by using a plasma chemical vapor device.

There are provided the method for preparing low-loss hydrogenated amorphous silicon that is transparent in visible light, the method for preparing low-loss hydrogenated amorphous silicon nitride that is transparent in visible light, and the method for preparing low-loss hydrogenated amorphous silicon oxide that is transparent in visible light configured to reduce production cost by simplifying the production process and are capable of mass production.

There are provided the method for preparing low-loss hydrogenated amorphous silicon that is transparent in visible light, the method for preparing low-loss hydrogenated amorphous silicon nitride that is transparent in visible light, and the method for preparing low-loss hydrogenated amorphous silicon oxide that is transparent in visible light with high refractive index and low absorption coefficient.

According to an embodiment of the present invention, there is provided a method for preparing low-loss hydrogenated amorphous silicon that is transparent in visible light comprising: a step in which a substrate is provided; a step in which a Plasma Enhanced Chemical Vapor Deposition (PECVD) which is used to insert $H_2$ gas and $SiH_4$ gas into a chamber, is used to deposit a dielectric layer onto the substrate, and process temperature is set from 170° C. to 180° C. and process pressure is set from 20 mTorr to 30 mTorr inside the chamber in which the Plasma Enhanced Chemical Vapor Deposition (PECVD) is executed.

Further, there is provided the method for preparing low-loss hydrogenated amorphous silicon that is transparent in visible light, provided with process temperature of 173° C. to 178° C. and process pressure of 23 mTorr to 27 mTorr inside the chamber.

According to another embodiment of the present invention, a method for preparing low-loss hydrogenated amorphous silicon that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer onto the substrate, and process pressure is set from 30 mTorr to 50 mTorr, and process temperature is set from 195° C. to 205° C. inside the chamber in which the Plasma Enhanced Chemical Vapor Deposition (PECVD) is executed.

Further, there is provided the method for preparing low-loss hydrogenated amorphous silicon that is transparent in visible light, provided with process pressure of 35 mTorr to 45 mTorr and process temperature of 200° C. inside the chamber.

Further, there is provided the method for preparing low-loss hydrogenated amorphous silicon that is transparent in visible light, provided with a radio-frequency power of 800 W and a flow-rate ratio of 7.5 inside the chamber.

Further, there is provided the method for preparing low-loss hydrogenated amorphous silicon that is transparent in visible light, provided with a radio-frequency power of 800 W and a flow-rate ratio of 7.5 inside the chamber.

Further, there is provided the method for preparing low-loss hydrogenated amorphous silicon that is transparent in visible light further comprising: a step in which the dielectric layer is formed into a metasurface comprising a plurality of nanostructures after a step in which a the Plasma Enhanced Chemical Vapor Deposition (PECVD) which is used to insert the $H_2$ gas and the $SiH_4$ gas into the chamber, is used to deposit the dielectric layer onto the substrate.

Further, the method for preparing low-loss hydrogenated amorphous silicon that is transparent in visible light of claim 7, the step in which the dielectric layer is formed into the metasurface comprising the plurality of nanostructures comprising: a step in which a resist is coated onto the dielectric layer; a step in which an electron-beam is projected onto the resist to form a pattern configured to form the plurality of nanostructures; and a step in which a chrome layer is deposited onto the resist, lift-off process and etching process is executed to remove the resist and the chrome layer, forming the metasurface with the plurality of nanostructures formed.

According to another embodiment of the present invention, there is provided a method for preparing low-loss hydrogenated amorphous silicon nitride that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer onto the substrate, and gases inserted into the chamber further comprise $N_2$ gas apart from the $H_2$ gas and the $SiH_4$ gas.

Further, there is provided The method for preparing low-loss hydrogenated amorphous silicon nitride that is transparent in visible light, wherein a ratio of the $H_2$ gas and the $SiH_4$ gas is 4.67 to 13.5, and wherein the $N_2$ gas is provided in less than 3% of all gases inserted into the chamber.

Further, there is provided the method for preparing low-loss hydrogenated amorphous silicon nitride that is transparent in visible light, provided with a chamber with process temperature of 180° C. to 220° C. and process pressure of 20 mTorr to 30 mTorr, in which the Plasma Enhanced Chemical Vapor Deposition (PECVD) is executed.

Further, there is provided the method for preparing low-loss hydrogenated amorphous silicon nitride that is transparent in visible light, further comprising: a step in which the dielectric layer is formed into a metasurface comprising a plurality of nanostructures after a step in which a the Plasma Enhanced Chemical Vapor Deposition (PECVD) which is used to insert the $H_2$ gas and the $SiH_4$ gas into the chamber, is used to deposit the dielectric layer onto the substrate.

Further, there is provided the method for preparing low-loss hydrogenated amorphous silicon nitride that is transparent in visible light, after the step in which the dielectric layer is formed into the metasurface comprising the plurality of nanostructures comprising: a step in which a resist is coated onto the dielectric layer; and a step in which an electron-beam is projected onto the resist to form a pattern configured to form the plurality of nanostructures.

According to another embodiment of the present invention, a method for preparing low-loss hydrogenated amorphous silicon oxide that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer onto the substrate, and gases inserted into the chamber further include $O_2$ gas apart from the $H_2$ gas and the $SiH_4$ gas.

Further, there is provided the method for preparing low-loss hydrogenated amorphous silicon oxide that is transparent in visible light, wherein a ratio of the $H_2$ gas and the $SiH_4$ gas is 4.67 to 13.5, and wherein the $O_2$ gas is provided in less than 3% of all gases inserted into the chamber.

Further, there is provided the method for preparing low-loss hydrogenated amorphous silicon oxide that is transparent in visible light, provided with a chamber with process temperature of 180° C. to 220° C. and process pressure of 20 mTorr to 30 mTorr, in which the Plasma Enhanced Chemical Vapor Deposition (PECVD) is executed.

According to another embodiment of the present invention, there is provided a method for preparing low-loss hydrogenated amorphous silicon that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer onto the substrate, and wherein a ratio of the $H_2$ gas and the $SiH_4$ gas is 4.67 to 13.167.

Further, there is provided the method for preparing low-loss hydrogenated amorphous silicon that is transparent in visible light, wherein a ratio of the $H_2$ gas and the $SiH_4$ gas is 7 to 8.

Further, there is provided the method for preparing low-loss hydrogenated amorphous silicon that is transparent in visible light, wherein the added gas comprises a noble gas.

Further, there is provided the method for preparing low-loss hydrogenated amorphous silicon that is transparent in visible light, wherein the noble gas is comprising Ar gas.

Further, there is provided the method for preparing low-loss hydrogenated amorphous silicon that is transparent in visible light, provided with a chamber with process temperature of 100° C. to 150° C. and process pressure of 40 mTorr, in which the Plasma Enhanced Chemical Vapor Deposition (PECVD) is executed.

Method for preparing low-loss hydrogenated amorphous silicon that is transparent in visible light, Method for preparing low-loss hydrogenated amorphous silicon oxide that is transparent in visible light, and Method for preparing low-loss hydrogenated amorphous silicon nitride that is transparent in visible light according to embodiments of the present invention are advantageous in that they are able to reduce cost of early production facilities.

Further, they are advantageous in that they reduce production cost by simplifying the production process and are capable of mass production.

Further, there is provided a low-loss hydrogenated amorphous silicon transparent to visible light with high refractive index and low absorption coefficient.

BRIEF DESCRIPTION OF DRAWINGS

FIG. 1 shows a schematic view of a flowchart of a method for preparing low-loss hydrogenated amorphous silicon that is transparent in visible light according to an embodiment of the present disclosure.

FIG. 2 shows a graph representing extinct coefficients according to process temperature within a chamber in the method for preparing low-loss hydrogenated amorphous silicon that is transparent in visible light of FIG. 1.

FIG. 3 shows a chart representing extinct coefficients according to the process temperature of FIG. 2.

FIG. 4 shows a graph representing extinct coefficients according to process pressure within a chamber in a method for preparing low-loss hydrogenated amorphous silicon that is transparent in visible light of FIG. 1.

FIG. 5 shows a chart representing extinct coefficients according to the process pressure of FIG. 4.

FIG. 6 conceptually shows the interior of a chamber in which the method for preparing low-loss hydrogenated amorphous silicon that is transparent in visible light of FIG. 1 is carried out.

FIG. 7 conceptually shows a cross section of low-loss hydrogenated amorphous silicon transparent to visible light 1 produced through step S1 and step S2 of the method for preparing low-loss hydrogenated amorphous silicon that is transparent in visible light of FIG. 1.

FIG. 8 shows an actual photo of the low-loss hydrogenated amorphous silicon transparent to visible light 1 produced through the step 1 S1 and the step 2 S2 of the method for preparing low-loss hydrogenated amorphous silicon that is transparent in visible light of FIG. 1.

FIG. 9 shows an actual photo of a conventional silicon which may be compared to the low-loss hydrogenated amorphous silicon transparent to visible light 1 of FIG. 8.

FIG. 10 shows a schematic view of the low-loss hydrogenated amorphous silicon transparent to visible light 1 with a metasurface formed by the method for preparing low-loss hydrogenated amorphous silicon that is transparent in visible light of FIG. 1.

FIG. 11 shows a graph representing a complex refractive index of the low-loss hydrogenated amorphous silicon transparent to visible light 1 measured through ellipsometry.

FIG. 12 shows a graph representing an adjustable range of a refractive index and extinct coefficients of the low-loss hydrogenated amorphous silicon transparent to visible light 1 which may be obtained from considering deposition condition of Plasma Enhanced Chemical Vapor Deposition (PECVD).

FIG. 13 shows the color, the refractive index and the extinct coefficients of the low-loss hydrogenated amorphous silicon transparent to visible light 1 according to the process temperature.

FIG. 14 shows the color, the refractive index and the extinct coefficient of the low-loss hydrogenated amorphous silicon transparent to visible light 1 according to the process pressure.

FIG. 15 shows a graph representing X-ray diffraction patterns of the low-loss hydrogenated amorphous silicon transparent to visible light 1.

FIG. 16 shows a schematic view of a flowchart of the method for preparing low-loss hydrogenated amorphous silicon that is transparent in visible light (comprising a method for preparing low-loss hydrogenated amorphous silicon nitride that is transparent in visible light and a method for preparing low-loss hydrogenated amorphous silicon oxide that is transparent in visible light according to another embodiment of the present disclosure.

FIG. 17 shows a chart representing the refractive index according to a wavelength of the low-loss hydrogenated amorphous silicon nitride transparent to visible light 1' formed through the Plasma Enhanced Chemical Vapor Deposition (PECVD) using $SiH_4$ gas, $H_2$ gas and $N_2$ gas in the method for preparing low-loss hydrogenated amorphous silicon that is transparent in visible light (comprising the method for preparing low-loss hydrogenated amorphous silicon nitride that is transparent in visible light and the method for preparing low-loss hydrogenated amorphous silicon oxide that is transparent in visible light) of FIG. 16.

FIG. 18 shows a chart representing the extinct coefficient according to a wavelength of the low-loss hydrogenated amorphous silicon nitride transparent to visible light 1' formed through the Plasma Enhanced Chemical Vapor Deposition (PECVD) using $SiH_4$ gas, $H_2$ gas and $N_2$ gas in the method for preparing low-loss hydrogenated amorphous silicon that is transparent in visible light (comprising the method for preparing low-loss hydrogenated amorphous silicon nitride that is transparent in visible light and the method for preparing low-loss hydrogenated amorphous silicon oxide that is transparent in visible light) of FIG. 16.

FIG. 19 shows a chart representing the refractive index according to a wavelength of the low-loss hydrogenated amorphous silicon oxide transparent to visible light 1' formed through the Plasma Enhanced Chemical Vapor Deposition (PECVD) using $SiH_4$ gas, $H_2$ gas and $O_2$ gas in the method for preparing low-loss hydrogenated amorphous silicon that is transparent in visible light of FIG. 16.

FIG. 20 shows a chart representing the extinct coefficient according to a wavelength of the low-loss hydrogenated amorphous silicon oxide transparent to visible light 1' formed through the Plasma Enhanced Chemical Vapor Deposition (PECVD) using $SiH_4$ gas, $H_2$ gas and $O_2$ gas in the method for preparing low-loss hydrogenated amorphous silicon that is transparent in visible light of FIG. 16.

FIG. 21 shows a schematic view of a cross section of the low-loss hydrogenated amorphous silicon transparent to visible light 1' formed by the method for preparing low-loss hydrogenated amorphous silicon that is transparent in visible light (comprising a method for preparing low-loss hydrogenated amorphous silicon nitride that is transparent in visible light and a method for preparing low-loss hydrogenated amorphous silicon oxide that is transparent in visible light).

FIG. 22 shows a chart representing the refractive index of low-loss hydrogenated amorphous silicon transparent to visible light 1' formed by adjusting the ratio of $H_2$ gas and $SiH_4$ gas which are inserted into the chamber of method for preparing low-loss hydrogenated amorphous silicon that is transparent in visible light of FIG. 16.

FIG. 23 shows a chart representing the extinct coefficient of low-loss hydrogenated amorphous silicon transparent to visible light 1' formed by adjusting the ratio of $H_2$ gas and $SiH_4$ gas which are inserted into the chamber of method for preparing low-loss hydrogenated amorphous silicon that is transparent in visible light of FIG. 16.

FIG. 24 shows a chart representing the refractive index according to the process pressure of the chamber when a 473 nm beam is incident to the low-loss hydrogenated amorphous silicon transparent to visible light formed through the Plasma Enhanced Chemical Vapor Deposition (PECVD) using $H_2$ gas and $SiH_4$ gas and a noble gas Ar in the method for preparing low-loss hydrogenated amorphous silicon that is transparent in visible light of FIG. 16.

FIG. 25 shows a chart representing the extinct coefficient according to the process pressure of the chamber when a 473 nm beam is incident to the low-loss hydrogenated amorphous silicon transparent to visible light formed through the Plasma Enhanced Chemical Vapor Deposition (PECVD) using $H_2$ gas and $SiH_4$ gas and a noble gas Ar in the method for preparing low-loss hydrogenated amorphous silicon that is transparent in visible light of FIG. 16.

FIG. 26 shows a chart representing the refractive index according to the process temperature and the process pressure of the graph illustrated in FIG. 24.

FIG. 27 shows a chart representing the extinct coefficient according to the process temperature and the process pressure of the graph illustrated in FIG. 25.

FIG. 28 shows a chart representing the refractive index when a 450 nm beam is incident to the low-loss hydrogenated amorphous silicon transparent to visible light produced under conditions identical to those of FIG. 24.

FIG. 29 shows a chart representing the extinct coefficient when a 450 nm beam is incident to the low-loss hydrogenated amorphous silicon transparent to visible light produced under conditions identical to those of FIG. 24.

FIG. 30 shows a chart representing the refractive index when a 532 nm beam is incident to the low-loss hydrogenated amorphous silicon transparent to visible light produced under conditions identical to those of FIG. 24.

FIG. 31 shows a chart representing the extinct coefficient when a 532 nm beam is incident to the low-loss hydrogenated amorphous silicon transparent to visible light produced under conditions identical to those of FIG. 24.

FIG. 32 shows a chart representing the refractive index when a 635 nm beam is incident to the low-loss hydrogenated amorphous silicon transparent to visible light produced under conditions identical to those of FIG. 24.

FIG. 33 shows a chart representing the extinct coefficient when a 635 nm beam is incident to the low-loss hydrogenated amorphous silicon transparent to visible light produced under conditions identical to those of FIG. 24.

DETAILED DESCRIPTION OF EXEMPLARY EMBODIMENTS

Hereinafter, specific exemplary embodiments of the present disclosure will be described in detail with reference to the accompanying drawings. Additionally, it is noted that in the description of the disclosure, the detailed description for known related configurations or functions may be omitted when it is deemed that such description may obscure essential points of the disclosure.

FIG. 1 shows a schematic view of a flowchart of a method for preparing low-loss hydrogenated amorphous silicon that is transparent in visible light according to an embodiment of the present disclosure, FIG. 2 shows a graph representing extinct coefficients according to process temperature within a chamber in the method for preparing low-loss hydrogenated amorphous silicon that is transparent in visible light of FIG. 1, FIG. 3 shows a chart representing extinct coefficients according to the process temperature of FIG. 2, FIG. 4 shows a graph representing extinct coefficients according to process pressure within a chamber in a method for preparing low-loss hydrogenated amorphous silicon that is transparent in visible light of FIG. 1, FIG. 5 shows a chart representing extinct coefficients according to the process pressure of FIG. 4, FIG. 6 conceptually shows the interior of a chamber in which the method for preparing low-loss hydrogenated amorphous silicon that is transparent in visible light of FIG. 1 is carried out, FIG. 7 conceptually shows a cross section of low-loss hydrogenated amorphous silicon transparent to visible light 1 produced through step S1 and step S2 of the method for preparing low-loss hydrogenated amorphous silicon that is transparent in visible light of FIG. 1, FIG. 8 shows an actual photo of the low-loss hydrogenated amorphous silicon transparent to visible light 1 produced through the step 1 S1 and the step 2 S2 of the method for preparing low-loss hydrogenated amorphous silicon that is transparent in visible light of FIG. 1, FIG. 9 shows an actual photo of a conventional silicon which may be compared to the low-loss hydrogenated amorphous silicon transparent to visible light 1 of FIG. 8 and FIG. 10 shows a schematic view of the low-loss hydrogenated amorphous silicon transparent to visible light 1 with a metasurface formed by the method for preparing low-loss hydrogenated amorphous silicon that is transparent in visible light of FIG. 1.

When referring to FIGS. 1 to 10, the method for preparing low-loss hydrogenated amorphous silicon that is transparent in visible light according to an embodiment of the present disclosure may include a step S1 in which a substrate 100 is provided; and a step S2 in which the Plasma Enhanced Chemical Vapor Deposition (PECVD) for inserting the $H_2$ gas and the $SiH_4$ gas into the chamber is used to deposit a dielectric layer 200 on the substrate 100.

Here, the low-loss hydrogenated amorphous silicon transparent to visible light 1 may be produced by adjusting the process temperature and the process pressure of the chamber in which the Plasma Enhanced Chemical Vapor Deposition (PECVD) is carried out to a particular condition.

In specific, the process temperature of the interior of the chamber may be from 170° C. to 180° C., and the process pressure may be from 20 mTorr to 30 mTorr. The process temperature of the interior of the chamber may be from 173° C. to 183° C. and the process pressure may be from 23 mTorr to 27 mTorr desirably. The process temperature of the interior of the chamber may be 175° C. and the process pressure may be 25 mTorr more desirably.

At this time, radio-frequency power may be 800 W, and flow-rate ratio of the $H_2$ gas and the $SiH_4$ gas may be 7.5.

FIGS. 2 and 3 respectively show the graph and the chart of the extinct coefficient of low-loss hydrogenated amorphous silicon transparent to visible light 1 according to the process temperature, and the extinct coefficient is the lowest at the process pressure of 25 mTorr and the process temperature of 175° C., and it is understood that abrupt change in the extinct coefficient is existent around the process temperature of 175° C.

That is, when the process pressure is 25 mTorr, a critical significance regarding the extinct coefficient is existent around the process temperature of 175° C.

When a beam with a wavelength of 630 nm to 635 nm (bottommost line) is incident to the low-loss hydrogenated amorphous silicon transparent to visible light 1 produced under the conditions illustrated in FIGS. 2 and 3, the extinct coefficient is 0.02, and when a beam with a wavelength of 530 nm to 535 nm (middle line) is incident, the extinct coefficient is 0.04, and when a beam with a wavelength of 445 nm to 455 nm (topmost line) is incident, the extinct coefficient is 0.13.

Here, the low extinct coefficient indicates that when a beam is projected on the low-loss hydrogenated amorphous silicon transparent to visible light 1, a more transparent low-loss hydrogenated amorphous silicon transparent to visible light 1 is emerged.

Further, the process pressure of the interior of the chamber is 30 mTorr to 50 mTorr, and the process temperature may be 195° C. to 205° C. Desirably, the process pressure of the interior of the chamber is 35 mTorr to 45 mTorr, and the process temperature may be 200° C.

In FIGS. 4 and 5, respectively show the graph and the chart of the extinct coefficient of low-loss hydrogenated amorphous silicon transparent to visible light 1 according to the process pressure, and the extinct coefficient is the lowest at the process temperature of 200° C. and the process pressure of 34 mTorr, and it is understood that abrupt change in the extinct coefficient is existent around the process pressure of 35 mTorr to 45 mTorr.

That is, it is understood that a critical significance regarding the extinct coefficient around the process pressure of 35 mTorr to 45 mTorr is existent at the process temperature of 200° C.

At this time, the radio-frequency power is 800 W, and the flow-rate ratio of the $H_2$ gas and the $SiH_4$ gas is 7.5.

When a beam with a wavelength of 630 nm to 635 nm (bottommost line) is incident to the low-loss hydrogenated amorphous silicon transparent to visible light 1 produced under the conditions illustrated in FIGS. 4 and 5, the extinct coefficient is 0.02, and when a beam with a wavelength of 530 nm to 535 nm (middle line) is incident, the extinct coefficient is 0.04, and when a beam with a wavelength of 445 nm to 455 nm (topmost line) is incident, the extinct coefficient is 0.13.

When the low-loss hydrogenated amorphous silicon transparent to visible light 1 is produced under such conditions, an amorphous silicon more transparent than the crystalline silicon known to be the most transparent historically in the RGB wavelength may be provided.

The applicant, while using the Plasma Enhanced Chemical Vapor Deposition (PECVD) as stated above, has derived the ideal process temperature and process pressure for producing low-loss hydrogenated amorphous silicon transparent to visible light 1 through countless repeated experiments.

When going through the steps S1 and S2, the low-loss hydrogenated amorphous silicon transparent to visible light 1 illustrated in FIGS. 7 and 8 may be produced.

When comparing the low-loss hydrogenated amorphous silicon transparent to visible light 1 produced through the method for preparing low-loss hydrogenated amorphous silicon that is transparent in visible light of the present embodiment illustrated in FIG. 8 to the conventional silicon illustrated in FIG. 9, the low-loss hydrogenated amorphous silicon transparent to visible light 1 illustrated in FIG. 8 is 73 nm in thickness which is thicker than the silicon illustrated in FIG. 9 with 48 nm thickness yet it is more transparent.

In the present embodiment, a dielectric layer 200 may be provided with a thickness of 10 nm to 100 nm.

Further, the dielectric layer 200 may be deposited on to the substrate 100 provided as fused silica. Here, the substrate 100 may be provided with the size of 2 cm×2 cm, but it is exemplary and the size of the substrate 100 is not limited to such.

Such $H_2$ gas and $SiH_4$ gas may be provided as hydrogenated amorphous silicon a-Si:H comprising the dielectric layer 200 by the equation below.

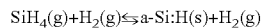

$$SiH_4(g)+H_2(g) \leftrightarrows \text{a-Si:H}(s)+H_2(g)$$

In such process, some H atoms may be trapped in the bonding structure of silicon and be hydrogenated.

Further, prior to the operation of the method for preparing low-loss hydrogenated amorphous silicon that is transparent in visible light, the chamber may be washed for 600 seconds with $O_2$ and $CF_4$ with the radio-frequency power and process temperature of 200° C.

After the step S2 in which the dielectric layer 200 is formed, step S3 in which the dielectric layer 200 is created with a metasurface comprising a plurality of nanostructures 211 may be additionally provided.

In specific, after depositing the dielectric layer 200 onto the substrate 100, the step S3 may execute a step S31 in which resist is coated on the dielectric layer 200, a step S32 in which a pattern configured to form a plurality of nanostructures 211 by projecting an electron-beam on the resist, and a step S33 in which a metasurface is formed, in which a chrome layer is deposited on the resist, the resist and the chrome layer are removed through a lift-off process and an etching process, and the plurality of the nanostructures 211 is formed.

Here, the metasurface is an ultra-thin film optical device constructed through arrangement of structures which are smaller than size of light, and each of the nanostructures 211 may adjust phase of an incident beam (refer to FIG. 10).

Further, the metasurface may be understood as the nanostructures 211 functioning in a geometrical shape as a meta material. Further, the meta material is an artificial material comprising electrical elements and magnetic elements which are inexistent in the actual world, and it is understood to have an arbitrarily designed valid refractive index. That is, the substrate 100 and the dielectric layer 200 may generally function as meta materials in the present embodiment.

The resist may be spin-coated at 2000 rpm for 60 seconds and may be baked on the plate for 5 minutes at 180° C. Further, in order to prevent charging effects from a dielectric substrate, a conductive polymer may be spin-coated at 2000 rpm for 60 seconds before the step in which the electron-beam is projected. At this time, the amount of projected electron-beam may approximately be from 1280 to 1,600 μC/cm2.

After exposure, the conductive polymer layer is removed from DI water, the resist is exposed to methyl isobutyl ketone/isopropyl alcohol, IPA 1:3 liquid at 0° C. for 12 minutes and may be washed with IPA for 30 seconds.

Then, chrome is deposited through electron-beam deposition and the lift-off process is executed in acetone for 10 minutes. Here, the patterned chrome layer is used as an etching mask for silicon, and the etching may be used to remove the silicon from parts without chrome layers. After the etching process, the chrome mask is removed with a chrome etching agent. By going through such process, the meta surface comprising the nanostructure 211 may be formed.

Hereinafter, the low-loss hydrogenated amorphous silicon transparent to visible light 1 manufactured through the method for preparing low-loss hydrogenated amorphous silicon that is transparent in visible light will be described in detail.

The low-loss hydrogenated amorphous silicon transparent to visible light 1 of the present embodiment may be applied to various optical devices such as a HoloLens expressing multiple colors and a color-correcting lens with a large diameter.

In order to be used in a hologram for storing images with different visible light metasurfaces, the hologram expressing multiple colors and the color correcting lens with a large diameter, the structure has to be constructed with a highly refractive material. SiO2 and SiN which are known as conventional transparent materials, have low refractive indices and reduce the performance of the metasurface, lightly refractive and transparent $TiO_2$ and GaN are costly in production and cause an issue of raising the price of the metasurface.

The low-loss hydrogenated amorphous silicon transparent to visible light 1 of the present embodiment transparent to visible light and is configured to be produced in a large size through the Plasma Enhanced Chemical Vapor Deposition (PECVD).

Further, when applying to the metasurface which requires high refractive index and less optical attenuation, it is advantageous in that the production cost may be significantly reduced by replacing the conventional material.

The low-loss hydrogenated amorphous silicon transparent to visible light 1 is configured to adjust 64.7% of light at a 450 nm wavelength, 90.9% at 532 nm and 96.6% at 635 nm, and is configured to control 42% of light at a 450 nm wavelength, 65% at 532 nm and 75% at 635 nm.

Further, the low-loss hydrogenated amorphous silicon transparent to visible light 1 may be provided with extinct coefficients of 0.082, 0.017 and 0.009 in wavelengths 635, 532 and 450 nm representing each of RGB.

When this is applied to the metasurface, measured efficiencies of 75%, 65%, and 42% at 635, 532 and 450 nm could be obtained. As the Plasma Enhanced Chemical Vapor Deposition (PECVD) is used, a large size production in Wafer-scale is possible, and production cost and initial design cost may be significantly reduced.

Such low-loss hydrogenated amorphous silicon transparent to visible light 1 may be achieved through adjusting the Plasma Enhanced Chemical Vapor Deposition (PECVD) and controlling hydrogenation and silicon disorder.

In specific, the optical characteristics of the hydrogenated amorphous silicon a-Si:H is affected by the average bond length between nearby Si atoms and the degree of disorder of Si.

The bond length of a-Si:H is more uniform than a general a-Si because dispersed H impurities reduce the number of weak bonds between Si atoms.

As a result, relatively uniform bond lengths are formed, bandgaps shift and optical characteristics of materials are changed. The dispersion of H impurities greatly influences the bond configuration of the Silicon, processing conditions of the Plasma Enhanced Chemical Vapor Deposition (PECVD) may be adjusted to control the optical characteristics of a-Si:H.

FIG. 11 shows a graph indicating the complex refractive index of the low-loss hydrogenated amorphous silicon transparent to visible light 1 measured with ellipsometry.

A Triple Tauc-Lorentz Dispersion model is close to identical with measured data and indicates the reliability of the measurements.

$\Psi Ex$ in FIG. 11 indicates a measured amplitude ratio, and $\Psi_{mod}$ indicates an amplitude ratio modelled with the Triple Tauc-Lorentz Dispersion model.

FIG. 12 shows a graph indicating the refractive index of low-loss hydrogenated amorphous silicon transparent to visible light 1 obtained by considering the deposition conditions of the Plasma Enhanced Chemical Vapor Deposition (PECVD) and the adjustable ranges of the extinct coefficients.

In specific, the gray area of (a) in FIG. 12 indicates the adjustable refractive index, and the gray area of (b) indicates the adjustable extinct coefficients.

When referring to FIG. 12, range ($\Delta k$) of the adjustable refractive index in a light wavelength of 450 nm is 1.6, and the minimum extinct coefficient is 0.082 which is lower than 0.13 of c-Si.

The applicant has analyzed atomic bonding structures and impurities of the Silicon and confirmed high transparency is related to minimization of c-Si and maximization of hydrogen concentration, and such may be achieved by adjusting the ideal process temperature and process pressure.

In the present embodiment, when the light with the wavelength of 450 nm is transmitted to the low-loss hydrogenated amorphous silicon transparent to visible light 1, the extinct coefficient is 0.08 to 0.09 (desirably 0.082), when the light with the wavelength of 532 nm is transmitted, the extinct coefficient is 0.015 to 0.02 (desirably 0.017), and when the light with the wavelength of 635 nm is transmitted, the extinct coefficient is 0.005 to 0.01 (desirably 0.009).

Such value is low enough to replace the conventional dielectric substances such as $TiO_2$ and GaN.

FIG. 13 shows the color, the refractive index and the extinct coefficient of low-loss hydrogenated amorphous silicon transparent to visible light 1 according to the process temperature.

In specific, (a) of FIG. 13 indicates the color of the low-loss hydrogenated amorphous silicon transparent to visible light 1 according to the process temperature, (b) represents the refractive index, and (c) indicates the extinct coefficient.

When referring to (b) of FIG. 13, the green area indicates the area in which the refractive index is greater than 4, and when referring to (c) of FIG. 13 the orange area indicates the area in which the extinct coefficient is smaller than 0.15. Further, the blue, green and red each indicate the lights with the wavelengths of 450 nm, 532 nm, and 635 nm.

FIG. 14 shows the color, the refractive index and the extinct coefficient of the low-loss hydrogenated amorphous silicon transparent to visible light 1 according to the process pressure.

In specific, (a) of FIG. 14 indicates the color of the low-loss hydrogenated amorphous silicon transparent to visible light 1 according to the process pressure, (b) represents the refractive index, and (c) indicates the extinct coefficient.

When referring to (b) of FIG. 14, the shaded area on the left indicates the area in which the refractive index is greater than 3.5, and when referring to (c) of FIG. 14, the shaded area in the center indicates the area in which the extinct coefficient is smaller than 0.1. Further, each of the line at the top, the line in the middle, and the line at the bottom indicate the lights with the wavelengths of 450 nm, 532 nm, and 635 nm.

Hereinafter, optical characteristics of the hydrogenated amorphous silicon a-Si:H will be described in detail.

The refractive index and the extinct coefficient which are unique material characteristics, may be obtained by measuring polarization state of the light reflected from the thin layer and through ellipsometry, and a complex Fresnel parameter of the ellipsometric data may be expressed as follows.

$$\rho = \frac{E_p}{E_s} = \tan(\Psi)e^{i\Delta}$$

Here, Ep and Es represent a transverse magnetic and electric waves, $\Psi$ represents the amplitude ratio and $\Delta$ represents phase difference.

The Triple Tauc-Lorentz Dispersion model is used to describe $\rho$ experimentally measured in the produced a-Si:H film. An imaginary part of dielectric permittivity may be obtained through Kramers-Kronig from TLD formula to calculate n and k of the thin layer. In order to minimize fitting errors in the process, the Triple Tauc-Lorentz Dispersion model may be used.

Hereinafter, characteristics of hydrogenated amorphous silicon a-Si:H will be described in detail.

The refractive index of the dielectric layer 200 comprising the hydrogenated amorphous silicon a-Si:H is decided by degree of structural disorder of hydrogenated silicon. This can be described with X-ray diffraction and Raman spectroscopy each illustrating compositions of long-range structural order and local bonding respectively.

In order to establish a correlation between the optical characteristics and the structural disorder, the process temperature and the process pressure may be selected when the radio-frequency power is 800 W, and the flow-rate ratio is 7.5.

FIG. 15 shows a graph representing the X-ray diffraction pattern of the low-loss hydrogenated amorphous silicon transparent to visible light 1.

In specific, (a) of FIG. 15 represents the X-ray diffraction pattern from altering the process temperature when the process pressure is 25 mTorr, and (b) of FIG. 15 represents the X-ray diffraction pattern from altering the process pressure when the process temperature is at 200° C.

When referring to FIG. 15, it is understood that the X-ray diffraction pattern compromises all amorphous silicon and nano crystalline silicon except when the low-loss hydrogenated amorphous silicon transparent to visible light 1 is deposited at the process temperature of 200° C. and the process pressure of 65 mTorr. They have wide diffraction peaks at an amorphous state of $2\theta=22.5°$ and each have crystalline states at 27.5° and 47° corresponding to 111 and 222 planes.

By altering the process temperature in the identical process pressure of 25 mTorr, the X-ray diffraction pattern is similar and the low-loss hydrogenated amorphous silicon transparent to visible light 1 may have identical crystalline portions.

On the contrary, crystallinity and a relative portion of a nanocrystal silicon nc-Si is changed when the process temperature is altered.

The X-ray diffraction pattern of the process pressure when deposited at the process pressure of 45 mTorr and the process temperature of 200° C., k is the lowest and half-width is lowest at 47° and shows the strongest peak.

When the process pressure is 65 mTorr, the crystalline portion is removed and shows higher extinct coefficient than low-loss hydrogenated amorphous silicon transparent to visible light 1 deposited at low pressure.

The low-loss hydrogenated amorphous silicon transparent to visible light 1 may be applied to optical components (typical convex, concave lens) that require highly refractive materials transparent in visible light, metasurfaces operating in visible light, and flexible metasurfaces which use high refraction.

FIG. 16 shows a schematic view of a flowchart of the method for preparing low-loss hydrogenated amorphous silicon that is transparent in visible light (including the low-loss hydrogenated amorphous silicon nitride transparent to visible light and the low-loss hydrogenated amorphous silicon oxide transparent to visible light).

FIG. 17 shows a chart representing the refractive index according to the wavelength of the low-loss hydrogenated amorphous silicon nitride transparent to visible light 1' formed by executing the Plasma Enhanced Chemical Vapor Deposition (PECVD) using the $SiH_4$ gas, $H_2$ gas and $N_2$ gas in the method for preparing low-loss hydrogenated amorphous silicon that is transparent in visible light (including the low-loss hydrogenated amorphous silicon nitride transparent to visible light and the low-loss hydrogenated amorphous silicon oxide transparent to visible light) of FIG. 16.

FIG. 18 shows a chart representing the extinct coefficient according to the wavelength of the low-loss hydrogenated amorphous silicon nitride transparent to visible light 1' formed by executing the Plasma Enhanced Chemical Vapor Deposition (PECVD) using the $SiH_4$ gas, $H_2$ gas and $N_2$ gas in the method for preparing low-loss hydrogenated amorphous silicon that is transparent in visible light (including the low-loss hydrogenated amorphous silicon nitride transparent to visible light and the low-loss hydrogenated amorphous silicon oxide transparent to visible light) of FIG. 16.

FIG. 21 conceptually shows a cross section of the low-loss hydrogenated amorphous silicon transparent to visible light, the low-loss hydrogenated amorphous silicon nitride transparent to visible light, and the low-loss hydrogenated amorphous silicon oxide transparent to visible light formed through the method for preparing low-loss hydrogenated amorphous silicon that is transparent in visible light (including the low-loss hydrogenated amorphous silicon nitride transparent to visible light and the low-loss hydrogenated amorphous silicon oxide transparent to visible light) of FIG. 16.

The embodiments illustrated in FIGS. 16 to 21 differ from the embodiments illustrated in FIGS. 1 to 15 in that additional gas (e.g. $N_2$ gas, $O_2$ gas) is included to the $H_2$ gas and the $SiH_4$ gas which are inserted into the chamber, so descriptions will majorly be made on the differences and descriptions for similar aspects will be cited with above descriptions and reference numbers.

In the case of the additional gas provided as the $N_2$ gas, the low-loss hydrogenated amorphous silicon nitride transparent to visible light may be formed and when the additional gas is the $O_2$ gas, the low-loss hydrogenated amorphous silicon oxide transparent to visible light may be formed.

Referring to FIGS. 16 to 18 and 21, the method for preparing low-loss hydrogenated amorphous silicon nitride that is transparent in visible light according to an embodiment of the present disclosure comprises: S1' a step providing a substrate 100'; and S2' a step in which the Plasma Enhanced Chemical Vapor Deposition (PECVD) for inserting the $H_2$ gas and the $SiH_4$ gas into the chamber is used to deposit a dielectric layer 200' on the substrate 100'.

Here, additional gas may be included in the $H_2$ gas and the $SiH_4$ gas which are inserted into the chamber, and the additional gas may be the $N_2$ gas.

That is, the $H_2$ gas, the $SiH_4$ gas, and the $N_2$ gas may be inserted into the chamber in a preset ratio.

In the case of the additional gas provided as the $N_2$ gas, the low-loss hydrogenated amorphous silicon nitride transparent to visible light may be formed.

Further, in the case of the additional gas provided as the $O_2$ gas, the low-loss hydrogenated amorphous silicon oxide transparent to visible light may be formed.

Further, the hydrogenated amorphous silicon nitride transparent to visible light and the hydrogenated amorphous silicon oxide transparent to visible light of the present embodiment share the same purpose with the hydrogenated amorphous silicon transparent to visible light.

In the present embodiment, the method for preparing low-loss hydrogenated amorphous silicon nitride that is transparent in visible light adjusts the ratio of the $H_2$ gas, the $SiH_4$ gas, and the $N_2$ gas inserted into the chamber, and the refractive index of the low-loss hydrogenated amorphous silicon transparent to visible light 1' generated by this process is higher than the refractive indices of existing commercial dielectrics ($TiO_2$, GaN, $Si_3N_4$) and yet the extinct coefficient in a visible spectrum of 450 nm to 635 nm may be below 0.15, desirably below 0.1 and more desirably below 0.05. Therefore, the low-loss hydrogenated amorphous silicon nitride transparent to visible light 1' may be utilized as a metasurface dielectric.

Hereinafter, in the case of the gases inserted in the chamber provided as the $H_2$ gas, the $SiH_4$ gas, and the $N_2$ gas, the refractive index and the extinct coefficient of the low-loss hydrogenated amorphous silicon nitride transparent to visible light 1' generated by the above ratio will be described in detail.

The ratio of the $H_2$ gas and the $SiH_4$ gas inserted into the chamber is 4.67 to 13.5, desirably 7 to 8, and the ratio of the $N_2$ gas is less than 5% of all gases inserted into the chamber, and desirably less than 3%. Here, all gases may consist of the $H_2$ gas, the $SiH_4$ gas, and the $N_2$ gas.

For example, referring to the first embodiment illustrated in FIGS. 17 and 18, the $SiH_4$ gas, the $H_2$ gas, and the $N_2$ gas inserted into the chamber have the ratio of $SiH_4$ gas:$H_2$ gas:$N_2$ gas=10:75:1, and the low-loss hydrogenated amorphous silicon nitride transparent to visible light 1' may show the refractive index of 3.424443 and the extinct coefficient of 0.149177 when a light with 450 nm wavelength is projected.

As such, when a light with 473 nm wavelength is projected on the low-loss hydrogenated amorphous silicon nitride transparent to visible light 1' generated by this, the refractive index is 3.325079 and the extinct coefficient is 0.091505, and when a light with 532 nm wavelength is projected, the refractive index is 3.132930 and the extinct coefficient is 0.015736, and when a light with 635 nm wavelength is projected, the refractive index is 2.947198 and the extinct coefficient is 0.

Further, when referring to the second embodiment, the $SiH_4$ gas, the $H_2$ gas, and the $N_2$ gas inserted into the chamber have the ratio of $SiH_4$ gas:$H_2$ gas:$N_2$ gas=10:75:3, and the low-loss hydrogenated amorphous silicon nitride transparent to visible light 1' may show the refractive index of 3.329697 and the extinct coefficient of 0.251804 when a light with 450 nm wavelength is projected.

Further, when referring to the third embodiment, the SiH$_4$ gas, the H$_2$ gas, and the N$_2$ gas inserted into the chamber have the ratio of SiH$_4$ gas:H$_2$ gas:N$_2$ gas=10:75:5, and the Low-loss hydrogenated amorphous silicon nitride transparent to visible light 1' may show the refractive index of 2.822514 and the extinct coefficient of 0.129003 when a light with 450 nm wavelength is projected.

In the first embodiment, flux of the N$_2$ gas entering the chamber is 1 sccm, flux of the N$_2$ in the second embodiment is 3 sccm, and flux of the N$_2$ gas in the third embodiment may be 5 sccm.

Further, the chamber in which the Plasma Enhanced Chemical Vapor Deposition (PECVD) of the first to the third embodiment is executed, the process temperature may be from 180° to 220°, desirably 200° and the process pressure may be from 20 mTorr to 30 mTorr and desirably 25 mTorr.

The H$_2$ gas, the SiH$_4$ gas, and the N$_2$ gas may be provided as a hydrogenated amorphous silicon nitride a-SiN$_x$:H on the dielectric layer 200' as the formula stated below.

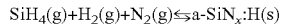

In such process, some H atoms may bond with a dangling bond of the silicon, and the amorphous silicon may be hydrogenated in the process.

FIG. 19 shows a chart representing the refractive index according to the wavelength of the low-loss hydrogenated amorphous silicon oxide transparent to visible light 1' formed by executing the Plasma Enhanced Chemical Vapor Deposition (PECVD) using the SiH$_4$ gas, H$_2$ gas and O$_2$ gas in the method for preparing low-loss hydrogenated amorphous silicon that is transparent in visible light (including the low-loss hydrogenated amorphous silicon nitride transparent to visible light and the low-loss hydrogenated amorphous silicon oxide transparent to visible light) of FIG. 16.

FIG. 20 shows a chart representing the extinct coefficient according to the wavelength of the low-loss hydrogenated amorphous silicon oxide transparent to visible light 1' formed by executing the Plasma Enhanced Chemical Vapor Deposition (PECVD) using the SiH$_4$ gas, H$_2$ gas and O$_2$ gas in the method for preparing low-loss hydrogenated amorphous silicon that is transparent in visible light (including the low-loss hydrogenated amorphous silicon nitride transparent to visible light and the low-loss hydrogenated amorphous silicon oxide transparent to visible light) of FIG. 16.

FIG. 21 conceptually shows a cross section of the low-loss hydrogenated amorphous silicon transparent to visible light, the low-loss hydrogenated amorphous silicon nitride transparent to visible light, and the low-loss hydrogenated amorphous silicon oxide transparent to visible light formed through the method for preparing low-loss hydrogenated amorphous silicon that is transparent in visible light (including the low-loss hydrogenated amorphous silicon nitride transparent to visible light and the low-loss hydrogenated amorphous silicon oxide transparent to visible light) of FIG. 16. When referring to FIGS. 16 to 19, hereinafter, when the gases inserted in the chamber are provided as the H$_2$ gas, the SiH$_4$ gas, and the O$_2$ gas, the refractive index and the extinct coefficient of the low-loss hydrogenated amorphous silicon oxide transparent to visible light 1' formed by them and their ratio will be explained in detail.

The method for preparing low-loss hydrogenated amorphous silicon oxide that is transparent in visible light comprises a step in which a substrate is provided and a step in which the Plasma Enhanced Chemical Vapor Deposition (PECVD) which inserts the H$_2$ gas and the SiH$_4$ gas in to the chamber deposits a dielectric layer on the substrate, and the gases added to the chamber may further include the O$_2$ gas apart from the H$_2$ gas and the SiH$_4$ gas. That is, in the present embodiment, the H$_2$ gas, the SiH$_4$ gas, and the O$_2$ gas may be inserted into the chamber in a preset ratio.

The method for preparing low-loss hydrogenated amorphous silicon oxide that is transparent in visible light adjusts the ratio of the H$_2$ gas, the SiH$_4$ gas, and the O$_2$ gas inserted into the chamber, so the refractive index of the low-loss hydrogenated amorphous silicon oxide transparent to visible light 1' is higher than the refractive indices of existing commercial dielectrics (TiO$_2$, GaN, Si$_3$N$_4$) and yet the extinct coefficient in a visible spectrum of 450 nm to 635 nm may be below 0.12. Likewise, the low-loss hydrogenated amorphous silicon oxide transparent to visible light 1' generated through such method may be utilized as a metasurface dielectric for visible light.

The ratio of the H$_2$ gas and the SiH$_4$ gas inserted into the chamber is 4.67 to 13.5 and the ratio of the O$_2$ gas is less than 5% of all gases inserted into the chamber, and desirably less than 3%. Here, all gases may consist of the H$_2$ gas, the SiH$_4$ gas, and the O$_2$ gas.

For example, when referring to the fourth embodiment illustrated in FIGS. 19 and 20, the SiH$_4$ gas, the H$_2$ gas, and the O$_2$ gas inserted into the chamber have the ratio of SiH$_4$ gas:H$_2$ gas:O$_2$ gas=10:75:1, and the low-loss hydrogenated amorphous silicon oxide transparent to visible light 1' may show the refractive index of 3.313264 and the extinct coefficient of 0.116119 when a light with 450 nm wavelength is projected.

Further, when referring to the fifth embodiment, the SiH$_4$ gas, the H$_2$ gas, and the O$_2$ gas inserted into the chamber have the ratio of SiH$_4$ gas:H$_2$ gas:O$_2$ gas=10:75:2, and the low-loss hydrogenated amorphous silicon oxide transparent to visible light 1' may show the refractive index of 2.9594 and the extinct coefficient of 0.097849 when a light with 450 nm wavelength is projected.

Further, when referring to the sixth embodiment, the SiH$_4$ gas, the H$_2$ gas, and the O$_2$ gas inserted into the chamber have the ratio of SiH$_4$ gas:H$_2$ gas:O$_2$ gas=10:75:3, and the low-loss hydrogenated amorphous silicon oxide transparent to visible light 1' may show the refractive index of 2.750408 and the extinct coefficient of 0.086736 when a light with 450 nm wavelength is projected.

In the fourth embodiment, flux of the O$_2$ gas entering the chamber is 1 sccm, flux of the O$_2$ in the fifth embodiment is 2 sccm, and flux of the O$_2$ gas in the sixth embodiment may be 3 sccm.

The chamber in which the Plasma Enhanced Chemical Vapor Deposition (PECVD) of the fourth to the sixth embodiment is executed, the process temperature may be from 180° to 220°, desirably 200° and the process pressure may be from 20 mTorr to 30 mTorr and desirably 25 mTorr.

The H$_2$ gas, the SiH$_4$ gas, and the O$_2$ gas may be provided as a hydrogenated amorphous silicon nitride a-SiN$_x$:H on the dielectric layer 200' as the formula stated below.

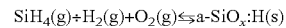

In such process, some H atoms may bond with a dangling bond of the silicon, and the amorphous silicon may be hydrogenated in the process.

When going through the steps S1' and S2' described in FIGS. 16 to 21, the low-loss hydrogenated amorphous silicon oxide transparent to visible light 1' or the low-loss hydrogenated amorphous silicon nitride transparent to visible light 1' conceptually shown in FIG. 21 may be produced.

Further, after the stage S2' in which the dielectric layer 200' is formed, S3' a step in which the dielectric layer 200' is formed into a metasurface comprising a plurality of nanostructures may be further provided.

In specific, the step S3' may execute a step in which a resist is coated onto the dielectric layer 200' after the dielectric layer 200' is deposited onto the substrate 100'; a step in which an electron-beam is projected onto the resist, forming a pattern in which a plurality of nanostructures may be formed; and a step in which a chrome layer is deposited onto the resist, the resist and the chrome layer is removed through lift-off process and etching process, forming a metasurface in which the plurality of nanostructures are formed.

Here, the metasurface is an ultra-thin layer optical device constructed by arranging structures smaller than light, and the nanostructure is configured to adjust the phase of incident light.

The step S3' is identical to the S3 illustrated in FIGS. 1 to 15 and the description regarding this will be replaced with the descriptions in FIGS. 1 to 15.

FIG. 22 shows a chart representing refractive index of low-loss hydrogenated amorphous silicon transparent to visible light 1' formed by adjusting the ratio of the $H_2$ gas and the $SiH_4$ gas inserted into the chamber.

FIG. 23 shows a chart representing extinct coefficient of low-loss hydrogenated amorphous silicon transparent to visible light 1' formed by adjusting the ratio of the $H_2$ gas and the $SiH_4$ gas inserted into the chamber.

The embodiments illustrated in FIGS. 22 and 23 in comparison with the FIGS. 1 to 15, differ in that the extinct coefficient is adjusted the extinct coefficient of the Low-loss hydrogenated amorphous silicon transparent to visible light is adjusted the ratio of the $H_2$ gas and the $SiH_4$ gas inserted into the chamber, and the descriptions will mainly be made on the differences and the similar aspects will be substituted with the above descriptions and reference numbers.

According to another embodiment of the present disclosure, the method for preparing low-loss hydrogenated amorphous silicon that is transparent in visible light may reduce the extinct coefficient of the low-loss hydrogenated amorphous silicon transparent to visible light 1' to below 0.022 by adjusting the ratio of the $H_2$ gas and the $SiH_4$ gas inserted into the chamber.

In specific, the method for preparing low-loss hydrogenated amorphous silicon that is transparent in visible light according to another embodiment of the present disclosure comprises a step in which a substrate is provided; a step in which the Plasma Enhanced Chemical Vapor Deposition (PECVD) which inserts the $H_2$ gas and the $SiH_4$ gas into the chamber deposits the dielectric layer onto the substrate, and the $H_2$ gas and the $SiH_4$ gas provided in the ratio of 4.67 to 13.167, desirably provided in the ratio of 8 to 13.167 and provided in 9.625 to 13.167 more desirably.

For example, when referring to the seventh and the eighth embodiment of FIGS. 22 and 23, by controlling the $H_2$ gas and the $SiH_4$ gas to the ratio of 8 to 13.167, when the method for preparing low-loss hydrogenated amorphous silicon that is transparent in visible light formed by this is projected with a light of 450 nm wavelength, the extinct coefficient may be implemented below 0.022.

When referring to first comparative example, when a light with 450 nm wavelength is projected onto the low-loss hydrogenated amorphous silicon transparent to visible light produced with the $H_2$ and the $SiH_4$ gas at the ratio of 3.25, the extinct coefficient is 0.25582 which exceeds the extinct coefficient of 0.022.

Further, when referring to second comparative example, when a light with 450 nm wavelength is projected onto the low-loss hydrogenated amorphous silicon transparent to visible light produced with the $H_2$ and the $SiH_4$ gas at the ratio of 4.67, the extinct coefficient is 0.119407 which exceeds the extinct coefficient of 0.022.

Further, when referring to third comparative example, when a light with 450 nm wavelength is projected onto the low-loss hydrogenated amorphous silicon transparent to visible light produced with the $H_2$ and the $SiH_4$ gas at the ratio of 7.5, the extinct coefficient is 0.0.030573 which exceeds the extinct coefficient of 0.022.

However, when referring to seventh embodiment, the ratio of the $H_2$ gas and the $SiH_4$ gas is controlled to be 9.625 and the extinct coefficient is 0.019089, which implements the extinct coefficient lower than 0.022.

Further, when referring to eighth embodiment, the ratio of the $H_2$ gas and the $SiH_4$ gas is controlled to be 13.167 and the extinct coefficient is 0.002124, which implements the extinct coefficient lower than 0.022.

The chamber of the seventh and eighth embodiment in which the Plasma Enhanced Chemical Vapor Deposition (PECVD) is executed may have the process temperature from 180° C. to 220° C., desirably 200° C., and the process pressure from 20 mTorr to 30 mTorr and desirably 25 mTorr.

FIG. 24 shows a chart representing the refractive index according to the process pressure of the chamber of the low-loss hydrogenated amorphous silicon transparent to visible light formed by executing the Plasma Enhanced Chemical Vapor Deposition (PECVD) with the $SiH_4$ gas, $H_2$ gas and a noble gas Ar in the method for preparing low-loss hydrogenated amorphous silicon that is transparent in visible light of FIG. 16.

FIG. 25 shows a chart representing the extinct coefficient according to the process pressure of the chamber of the low-loss hydrogenated amorphous silicon transparent to visible light formed by executing the Plasma Enhanced Chemical Vapor Deposition (PECVD) with the $SiH_4$ gas, $H_2$ gas and a noble gas Ar in the method for preparing low-loss hydrogenated amorphous silicon that is transparent in visible light of FIG. 16.

FIG. 26 shows the refractive index according to the process temperature and the process pressure of the graph illustrated in FIG. 24.

FIG. 27 shows the extinct coefficient according to the process temperature and the process pressure of the graph illustrated in FIG. 25.

In FIGS. 24 and 25, a line labeled A represents the 100° C. line of the process temperature, the line labeled B represents 150° C. line of the process temperature, the line labeled C represents the 200° C. line of the process temperature, the line indicated D represents the 250° C. line of the process temperature, and the line indicated E represents the 300° C. line of the process temperature.

The embodiments illustrated in FIGS. 24 to 27 may be understood as the embodiments illustrated in FIGS. 16 to 21 with noble gas included as an additional gas.

The method for preparing low-loss hydrogenated amorphous silicon that is transparent in visible light according to another embodiment of the invention adds a noble gas (e.g. argon Ar) into the $H_2$ and $SiH_4$ gas inserted into the chamber, controls the process pressure and the process temperature and optimizes the refractive index of the low-loss hydrogenated amorphous silicon transparent to visible light formed by this.

In the embodiments illustrated in FIGS. 24 to 27, the low-loss hydrogenated amorphous silicon transparent to visible light is produced through the Plasma Enhanced Chemical Vapor Deposition (PECVD) by inserting the $H_2$ gas, the $SiH_4$ gas, and the Ar gas into the chamber.

In an embodiment, when the low-loss hydrogenated amorphous silicon transparent to visible light is transmitted with light with wavelength of 473 nm, the extinct coefficient is aimed to be implemented above 0.01 and below 0.03.

When referring to FIGS. 24 to 27, when the low-loss hydrogenated amorphous silicon transparent to visible light produced at the process pressure of 40 mTorr and the process temperature of 100° C. is transmitted with light with wavelength of 473 nm, the extinct coefficient is 0.02562 and the refractive index is 2.681456.

It is understood that when the low-loss hydrogenated amorphous silicon transparent to visible light produced at the process pressure of 40 mTorr and the process temperature of 150° C. is transmitted with light with wavelength of 473 nm, the extinct coefficient is 0.013462 and the refractive index is 3.025.

That is, when the low-loss hydrogenated amorphous silicon transparent to visible light produced at the process pressure of 40 mTorr and the process temperature of 100° C. to 150° C. is transmitted with light with wavelength of 473 nm, the extinct coefficient is implemented above 0.01 and below 0.03.

FIG. 28 shows a chart representing the refractive index when the low-loss hydrogenated amorphous silicon transparent to visible light produced under the same condition as FIG. 24 is transmitted with light with wavelength of 450 nm.

FIG. 29 shows a chart representing the extinct coefficient when the low-loss hydrogenated amorphous silicon transparent to visible light produced under the same condition as FIG. 24 is transmitted with light with wavelength of 450 nm.

In the embodiments illustrated in FIGS. 28 and 29, when the low-loss hydrogenated amorphous silicon transparent to visible light is transmitted with light with wavelength of 450 nm, the goal is to implement the extinct coefficient above 0.04 and below 0.05.

When referring to FIGS. 28 and 29, such condition is satisfied when the process temperature is 100° C. to 150° C. and the process pressure is 40 mTorr.

FIG. 30 shows a chart representing the refractive index when the low-loss hydrogenated amorphous silicon transparent to visible light produced under the same condition as FIG. 24 is transmitted with light with wavelength of 532 nm.

FIG. 31 shows a chart representing the extinct coefficient when the low-loss hydrogenated amorphous silicon transparent to visible light produced under the same condition as FIG. 24 is transmitted with light with wavelength of 532 nm.

In the embodiments illustrated in FIGS. 30 and 31, when the low-loss hydrogenated amorphous silicon transparent to visible light is transmitted with light with wavelength of 532 nm, the goal is to implement the extinct coefficient below 0.0003.

When referring to FIGS. 30 and 31, such condition is satisfied when the process temperature is 100° C. to 200° C. and the process pressure is 40 mTorr.

FIG. 32 shows a chart representing the refractive index when the low-loss hydrogenated amorphous silicon transparent to visible light produced under the same condition as FIG. 24 is transmitted with light with wavelength of 635 nm.

FIG. 33 shows a chart representing the extinct coefficient when the low-loss hydrogenated amorphous silicon transparent to visible light produced under the same condition as FIG. 24 is transmitted with light with wavelength of 635 nm.

In the embodiments illustrated in FIGS. 32 and 33, when the low-loss hydrogenated amorphous silicon transparent to visible light is transmitted with light with wavelength of 532 nm, the goal is to implement the extinct coefficient close to 0.

When referring to FIGS. 32 and 33, such condition is satisfied in all conditions of the process temperature and the process pressure.

The following is a list of the above mentioned embodiments.

Item 1 may provide a method for preparing low-loss hydrogenated amorphous silicon that is transparent in visible light comprising: a step in which a substrate is provided; a step in which a Plasma Enhanced Chemical Vapor Deposition (PECVD) which is used to insert $H_2$ gas and $SiH_4$ gas into a chamber, is used to deposit a dielectric layer onto the substrate, and process temperature is set from 170° C. to 180° C. and process pressure is set from 20 mTorr to 30 mTorr inside the chamber in which the Plasma Enhanced Chemical Vapor Deposition (PECVD) is executed.

Item 2 may provide the method for preparing low-loss hydrogenated amorphous silicon that is transparent in visible light of Item 1, provided with process temperature of 173° C. to 178° C. and process pressure of 23 mTorr to 27 mTorr inside the chamber.

Item 3 may provide the method for preparing low-loss hydrogenated amorphous silicon that is transparent in visible light of Items 1 or 2 comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer onto the substrate, and process pressure is set from 30 mTorr to 50 mTorr, and process temperature is set from 195° C. to 205° C. inside the chamber in which the Plasma Enhanced Chemical Vapor Deposition (PECVD) is executed.

Item 4 may provide the method for preparing low-loss hydrogenated amorphous silicon that is transparent in visible light of Items 1 to 3, provided with process pressure of 35 mTorr to 45 mTorr and process temperature of 200° C. inside the chamber.

Item 5 may provide the method for preparing low-loss hydrogenated amorphous silicon that is transparent in visible light of Items 1 to 4, provided with a radio-frequency power of 800 W and a flow-rate ratio of 7.5 inside the chamber.

Item 6 may provide the method for preparing low-loss hydrogenated amorphous silicon nitride that is transparent in visible light of Items 1 to 5, further comprising: a step in which the dielectric layer is formed into a metasurface comprising a plurality of nanostructures after a step in which a the Plasma Enhanced Chemical Vapor Deposition (PECVD) which is used to insert the $H_2$ gas and the $SiH_4$ gas into the chamber, is used to deposit the dielectric layer onto the substrate.

Item 7 may provide the method for preparing low-loss hydrogenated amorphous silicon that is transparent in visible light of Items 1 to 6, the step in which the dielectric layer is formed into the metasurface comprising the plurality of nanostructures comprising: a step S31 in which a resist is coated onto the dielectric layer; a step S32 in which an electron-beam is projected onto the resist to form a pattern configured to form the plurality of nanostructures; and a step S33 in which a chrome layer is deposited onto the resist, lift-off process and etching process is executed to remove the resist and the chrome layer, forming the metasurface with the plurality of nanostructures formed.

Item 8 may provide a hydrogenated amorphous silicon, wherein the low-loss hydrogenated amorphous silicon transparent to visible light is transmitted with light with wavelength of 450 nm, extinct coefficient is from 0.08 to 0.09, when light with wavelength of 532 nm is transmitted, the extinct coefficient is 0.015 to 0.02, and when a light with wavelength of 635 nm is transmitted, the extinct coefficient is 0.005 to 0.01

Item 9 may provide the hydrogenated amorphous silicon of Item 8 wherein the low-loss hydrogenated amorphous silicon transparent to visible light transmitted with light with wavelength of 450 nm, adjustable refractive index range is 1.6 and adjustable extinct coefficient range is 0.4

Item 10 may provide a method for preparing low-loss hydrogenated amorphous silicon nitride that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer onto the substrate, and gases inserted into the chamber further comprise $N_2$ gas apart from the $H_2$ gas and the $SiH_4$ gas.

Item 11 may provide the method for preparing low-loss hydrogenated amorphous silicon nitride that is transparent in visible light of Item 10, wherein a ratio of the $H_2$ gas and the $SiH_4$ gas is 4.67 to 13.5, and wherein the $N_2$ gas is provided in less than 3% of all gases inserted into the chamber.

Item 13 may provide the method for preparing low-loss hydrogenated amorphous silicon nitride that is transparent in visible light of Items 11 or 12, which is provided with a chamber with process temperature of 180° C. to 220° C. and process pressure of 20 mTorr to 30 mTorr, in which the Plasma Enhanced Chemical Vapor Deposition (PECVD) is executed.

Item 14 may provide the method for preparing low-loss hydrogenated amorphous silicon nitride that is transparent in visible light of Items 11 to 13, further comprising: a step in which the dielectric layer is formed into a metasurface comprising a plurality of nanostructures after a step in which a the Plasma Enhanced Chemical Vapor Deposition (PECVD) which is used to insert the $H_2$ gas and the $SiH_4$ gas into the chamber, is used to deposit the dielectric layer onto the substrate.

Item 15 may provide the method for preparing low-loss hydrogenated amorphous silicon nitride that is transparent in visible light of Items 11 to 14, the step in which the dielectric layer is formed into the metasurface comprising the plurality of nanostructures comprising: a step in which a resist is coated onto the dielectric layer; and a step in which an electron-beam is projected onto the resist to form a pattern configured to form the plurality of nanostructures.

Item 16 may provide a method for preparing low-loss hydrogenated amorphous silicon oxide that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer onto the substrate, and gases inserted into the chamber further include $O_2$ gas apart from the $H_2$ gas and the $SiH_4$ gas.

Item 17 may provide the method for preparing low-loss hydrogenated amorphous silicon oxide that is transparent in visible light of Item 16, is provided with a chamber with process temperature of 180° C. to 220° C. and process pressure of 20 mTorr to 30 mTorr, in which the Plasma Enhanced Chemical Vapor Deposition (PECVD) is executed.

Item 18 may provide a method for preparing low-loss hydrogenated amorphous silicon that is transparent in visible light comprising: a step in which a substrate is provided; a step in which a Plasma Enhanced Chemical Vapor Deposition (PECVD) which is used to insert $H_2$ gas and $SiH_4$ gas into a chamber is used to deposit a dielectric layer 200 onto the substrate, and wherein a ratio of the $H_2$ gas and the $SiH_4$ gas is 4.67 to 13.167.

Item 19 may provide the method for preparing low-loss hydrogenated amorphous silicon that is transparent in visible light Items 1 to 7 and 18, wherein a ratio of the $H_2$ gas and the $SiH_4$ gas is 7 to 8.

Item 20 may provide the method for preparing low-loss hydrogenated amorphous silicon that is transparent in visible light of Items 1 to 7 and 19, wherein the added gas comprises a noble gas.

Item 21 may provide the method for preparing low-loss hydrogenated amorphous silicon that is transparent in visible light of Items 1 to 7 and 20, wherein the noble gas is comprising Ar gas.

Item 22 may provide the method for preparing low-loss hydrogenated amorphous silicon that is transparent in visible light of Items 1 to 7 and 21, provided with a chamber with process temperature of 100° C. to 150° C. and process pressure of 40 mTorr, in which the Plasma Enhanced Chemical Vapor Deposition (PECVD) is executed.

While until now the low-loss hydrogenated amorphous silicon transparent to visible light 1 and the method for manufacturing the same according to examples of the disclosure have been described as concrete embodiments, these are just exemplary embodiments, and the present disclosure should be construed in the broadest scope consistent with the fundamental technical ideas disclosed herein, rather than as being limited to them. By combining or replacing a part or parts of embodiments disclosed herein, a person having ordinary skill in the art may practice an embodiment which is not explicitly described herein, and however, it should be noted that it shall not depart from the scope of the patent right of this disclosure. Besides, a person having ordinary skill in the art may easily change or modify embodiments disclosed herein based on this disclosure, and however, it is obvious that such changes or modifications also fall within the scope of the patent right of this disclosure.

What is claimed is:

1. A method for preparing low-loss hydrogenated amorphous silicon that is transparent in visible light comprising: a step in which a substrate is provided;
a step in which a Plasma Enhanced Chemical Vapor Deposition (PECVD) which is used to insert $H_2$ gas and $SiH_4$ gas into a chamber, is used to deposit a dielectric layer onto the substrate, and
process temperature is set from 170° C. to 180° C. and process pressure is set from 20 mTorr to 30 mTorr inside the chamber in which the Plasma Enhanced Chemical Vapor Deposition (PECVD) is executed,
wherein the hydrogenated amorphous silicon is formed to be transparent to a wavelength range of visible light.

2. The method for preparing low-loss hydrogenated amorphous silicon that is transparent in visible light of claim 1, is provided with process temperature of 173° C. to 178° C. and process pressure of 23 mTorr to 27 mTorr inside the chamber.

3. A method for preparing low-loss hydrogenated amorphous silicon that is transparent in visible light comprising: a step in which a substrate is provided;
a step in which a Plasma Enhanced Chemical Vapor Deposition (PECVD) which is used to insert $H_2$ gas and $SiH_4$ gas into a chamber is used to deposit a dielectric layer onto the substrate, and process pressure is set from 30 mTorr to 50 mTorr, and process temperature is set from 195° C. to 205° C. inside the chamber in which the Plasma Enhanced Chemical Vapor Deposition (PECVD) is executed, wherein the hydrogenated amorphous silicon is formed to be transparent to a wavelength range of visible light.

4. The method for preparing low-loss hydrogenated amorphous silicon that is transparent in visible light of claim 1, is provided with process pressure of 35 mTorr to 45 mTorr and process temperature of 200° C. inside the chamber.

5. The method for preparing low-loss hydrogenated amorphous silicon that is transparent in visible light of claim 1, is provided with a radio-frequency power of 800 W and a flow-rate ratio ($H_2$:$SiH_4$ ratio) of 7.5 inside the chamber.

6. The method for preparing low-loss hydrogenated amorphous silicon that is transparent in visible light of claim 4, is provided with a radio-frequency power of 800 W and a flow-rate ratio ($H_2$:$SiH_4$ ratio) of 7.5 inside the chamber.

7. The method for preparing low-loss hydrogenated amorphous silicon that is transparent in visible light of claim 1, further comprising: a step in which the dielectric layer is formed into a metasurface comprising a plurality of nanostructures after a step in which the Plasma Enhanced Chemical Vapor Deposition (PECVD) which is used to insert the $H_2$ gas and the $SiH_4$ gas into the chamber, is used to deposit the dielectric layer onto the substrate.

8. The method for preparing low-loss hydrogenated amorphous silicon that is transparent in visible light of claim 7, the step in which the dielectric layer is formed into the metasurface comprising the plurality of nanostructures comprising:

a step in which a resist is coated onto the dielectric layer;

a step in which an electron-beam is projected onto the resist to form a pattern configured to form the plurality of nanostructures;

and a step in which a chrome layer is deposited onto the resist, lift-off process and etching process is executed to remove the resist and the chrome layer, forming the metasurface with the plurality of nanostructures formed.

9. A method for preparing low-loss hydrogenated amorphous silicon that is transparent in visible light comprising:

a step in which a substrate is provided;

a step in which a Plasma Enhanced Chemical Vapor Deposition (PECVD) which is used to insert $H_2$ gas and $SiH_4$ gas into a chamber is used to deposit a dielectric layer onto the substrate, and wherein a ratio of the $H_2$ gas and the $SiH_4$ gas is 4.67 to 13.167.

10. The method for preparing low-loss hydrogenated amorphous silicon that is transparent in visible light of claim 9, wherein a ratio of the $H_2$ gas and the $SiH_4$ gas is 7 to 8.

11. A method for preparing low-loss hydrogenated amorphous silicon that is transparent in visible light comprising:

a step in which a substrate is provided;

a step in which a Plasma Enhanced Chemical Vapor Deposition (PECVD) which is used to insert $H_2$ gas and $SiH_4$ gas into a chamber is used to deposit a dielectric layer onto the substrate, and gases inserted into the chamber further comprise a noble gas apart from the $H_2$ gas and the $SiH_4$ gas, wherein the noble gas is comprising Ar gas, process temperature is set from 100° C. to 150° C. and process pressure is set 40 mTorr inside the chamber in which the Plasma Enhanced Chemical Vapor Deposition (PECVD) is executed, wherein the hydrogenated amorphous silicon is formed to be transparent to a wavelength range of visible light.

* * * * *